United States Patent [19]
Saito et al.

[11] Patent Number: 6,043,743
[45] Date of Patent: Mar. 28, 2000

[54] PASSENGER DETECTING SYSTEM AND PASSENGER DETECTING METHOD

[75] Inventors: Takashi Saito, Osaka; Masahiro Ofuji, Kanagawa; Kazunori Jinno, Osaka; Masanori Sugino, Kanagawa, all of Japan

[73] Assignee: NEC Corporation, Japan

[21] Appl. No.: 09/028,282

[22] Filed: Feb. 25, 1998

[30] Foreign Application Priority Data

| Feb. 26, 1997 | [JP] | Japan | 9-042649 |
| Feb. 26, 1997 | [JP] | Japan | 9-042650 |
| Feb. 26, 1997 | [JP] | Japan | 9-042651 |
| Feb. 26, 1997 | [JP] | Japan | 9-042652 |

[51] Int. Cl.[7] .................................................. G08B 13/26
[52] U.S. Cl. ........................ 340/562; 280/735; 180/271
[58] Field of Search .................... 340/562, 573.4, 340/870.37; 280/728.1, 728.2, 734, 735; 180/271, 273

[56] References Cited

U.S. PATENT DOCUMENTS

| 4,887,024 | 12/1989 | Sugiyama et al. | 324/61 R |
| 5,446,391 | 8/1995 | Aoki et al. | 324/661 |
| 5,570,903 | 11/1996 | Meister et al. | 280/735 |
| 5,618,056 | 4/1997 | Schoos et al. | 280/735 |
| 5,722,686 | 3/1998 | Blackburn et al. | 280/735 |
| 5,724,024 | 3/1998 | Sonderegger et al. | 340/562 |
| 5,760,688 | 6/1998 | Kasai | 340/561 |
| 5,802,479 | 9/1998 | Kithil et al. | 701/45 |

FOREIGN PATENT DOCUMENTS

| 6-65532 | 8/1994 | Japan . |
| 9-509118 | 9/1997 | Japan . |
| 95 21752 | 8/1995 | WIPO . |

*Primary Examiner*—Jeffery A. Hofsass
*Assistant Examiner*—Toan N. Pham
*Attorney, Agent, or Firm*—Ostrolenk, Faber, Gerb & Soffen, LLP

[57] ABSTRACT

A passenger detecting system is disclosed, that comprises a seat, a plurality of electrodes disposed at predetermined intervals on at least the front surface of the seat, an oscillating circuit for generating a weak electric field between at least one particular electrode (referred to as a first type electrode) of the electrodes and the other electrodes (referred to as second type electrodes), a current/voltage converting circuit for detecting displacement currents that flow corresponding to the weak electric field and for converting the displacement currents into respective voltages, a controlling circuit for detecting a seating pattern of an passenger or the like on the seat corresponding to output signals of the current/voltage converting circuit, and an air bag device for inflating an air bag in case of a collision.

48 Claims, 26 Drawing Sheets

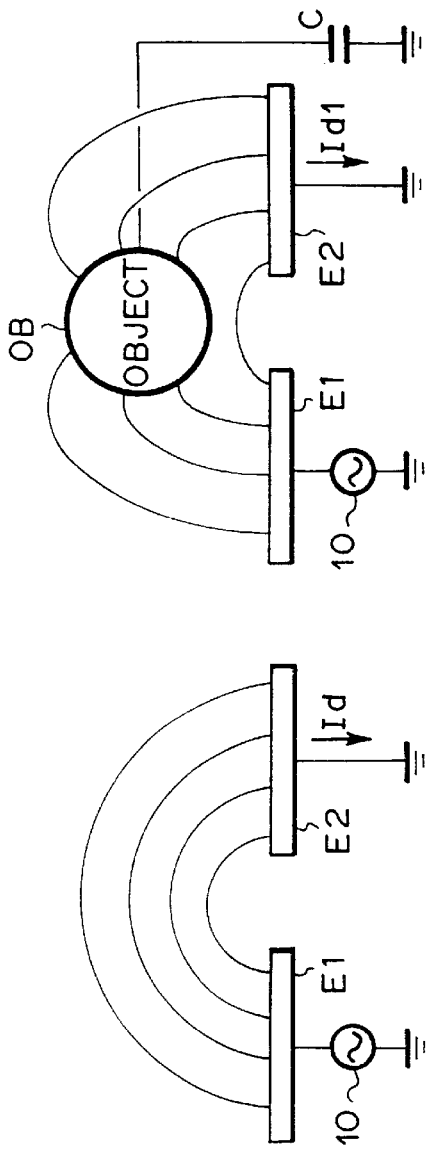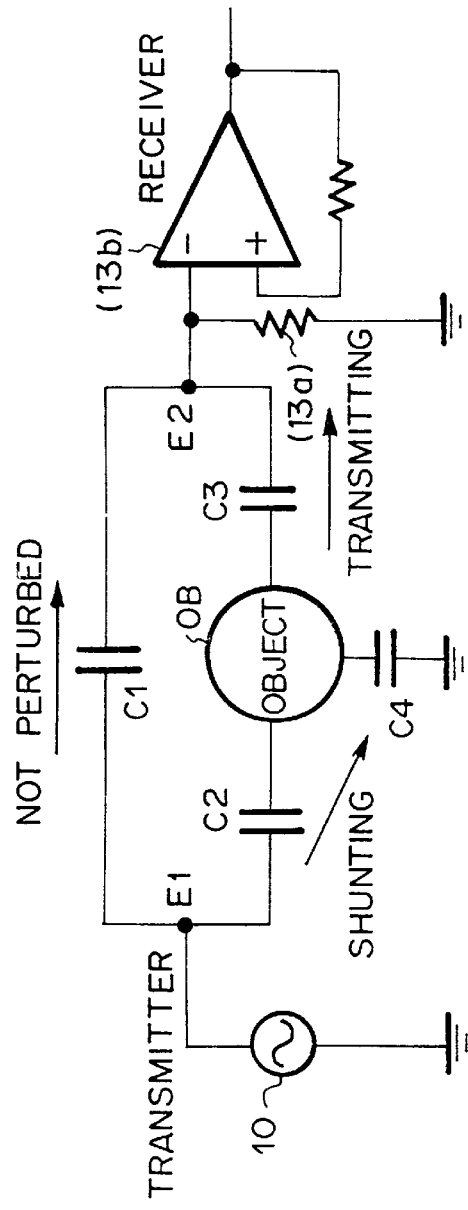

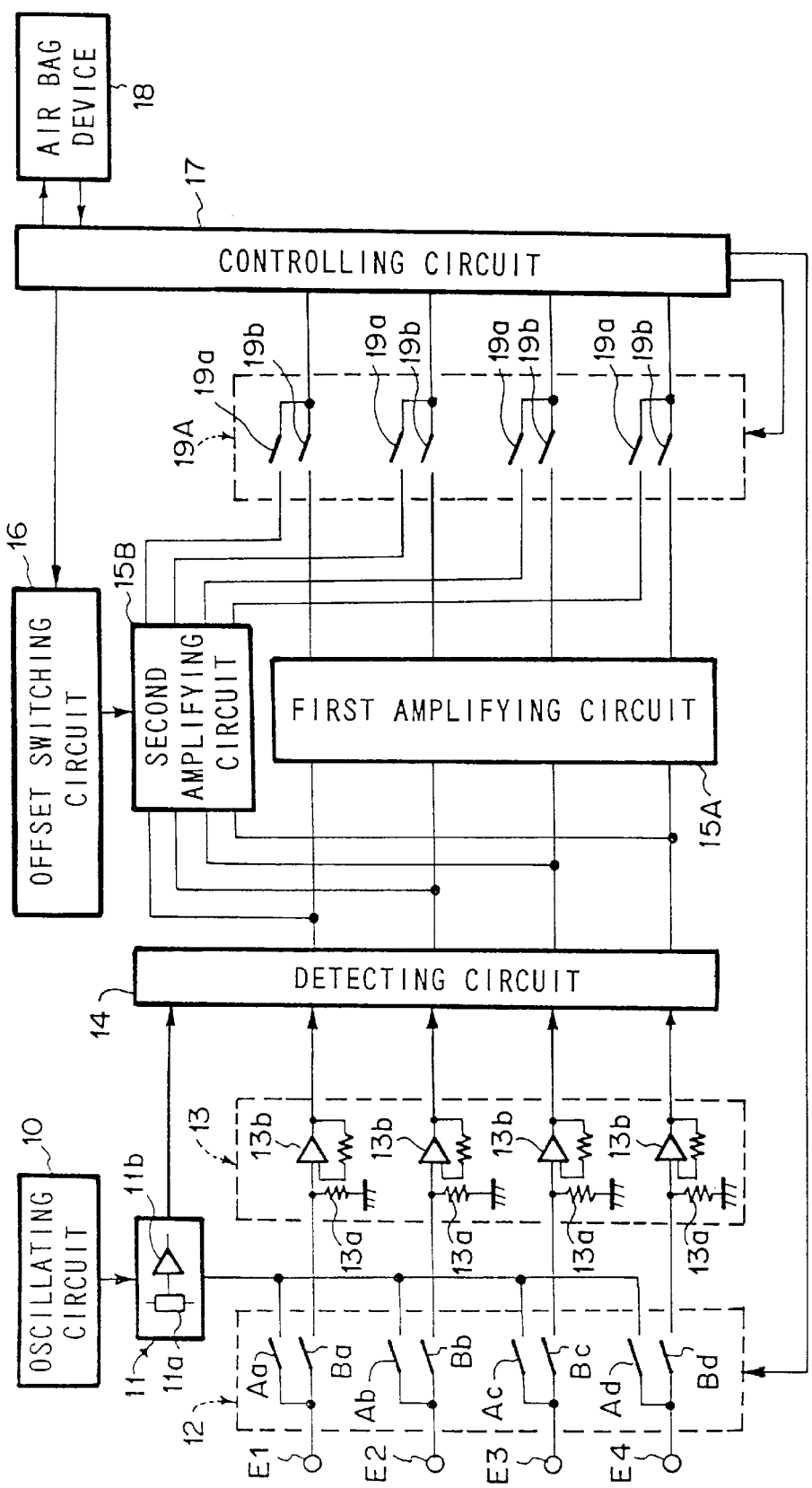

FIG.11A

| TRANS-MISSION SIDE \ RECEPTION SIDE | ELECTRODE E1 | ELECTRODE E2 | ELECTRODE E3 | ELECTRODE E4 |
|---|---|---|---|---|
| ELECTRODE E1 | R (1, 1) | R (1, 2) | R (1, 3) | R (1, 4) |
| ELECTRODE E2 | R (2, 1) | R (2, 2) | R (2, 3) | R (2, 4) |
| ELECTRODE E3 | R (3, 1) | R (3, 2) | R (3, 3) | R (3, 4) |
| ELECTRODE E4 | R (4, 1) | R (4, 2) | R (4, 3) | R (4, 4) |

FIG.11B

| TRANS-MISSION SIDE \ RECEPTION SIDE | ELECTRODE E1 | ELECTRODE E2 | ELECTRODE E3 | ELECTRODE E4 |
|---|---|---|---|---|
| ELECTRODE E1 | 12166 | 965 | 116 | 146 |
| ELECTRODE E2 | 1017 | 115582 | 367 | 148 |
| ELECTRODE E3 | 146 | 305 | 118855 | 595 |
| ELECTRODE E4 | 71 | 0 | 528 | 116692 |

EMPTY

FIG. 11C

FFCS

| TRANS-MISSION SIDE \ RECEPTION SIDE | ELECTRODE E1 | ELECTRODE E2 | ELECTRODE E3 | ELECTRODE E4 |
|---|---|---|---|---|
| ELECTRODE E1 | 121868 | 928 | 169 | 216 |
| ELECTRODE E2 | 981 | 11600 | 354 | 250 |
| ELECTRODE E3 | 198 | 290 | 11873 | 668 |
| ELECTRODE E4 | 147 | 106 | 599 | 11719 |

FIG.11D

| TRANS-MISSION SIDE \ RECEPTION SIDE | ELECTRODE E1 | ELECTRODE E2 | ELECTRODE E3 | ELECTRODE E4 |
|---|---|---|---|---|
| ELECTRODE E1 | 121995 | 937 | 192 | 179 |
| ELECTRODE E2 | 989 | 116600 | 381 | 179 |
| ELECTRODE E3 | 221 | 318 | 118859 | 573 |
| ELECTRODE E4 | 109 | 33 | 518 | 116694 |

RFIS

F I G. 11E

| TRANS-MISSION SIDE \ RECEPTION SIDE | ELECTRODE E1 | ELECTRODE E2 | ELECTRODE E3 | ELECTRODE E4 |
|---|---|---|---|---|
| ELECTRODE E1 | 9636 | 3315 | 1732 | 1619 |
| ELECTRODE E2 | 3536 | 9861 | 2641 | 2452 |
| ELECTRODE E3 | 1419 | 2117 | 9187 | 1065 |
| ELECTRODE E4 | 1278 | 1891 | 1035 | 9176 |

PERSON

F I G.12

$R(4,3) > TH1$
$\& R(4,2) > TH2$
$\& R(4,1) > TH3$
$\& R(4,1) - R(4,2) > TH4$
$\& R(4,1) - R(4,3) > TH5$
$\& R(4,2) - R(4,3) > TH6$
$\& R(3,1) - R(3,4) > TH7$
$\& R(2,4) - R(2,1) > TH8$
$\& R(1,4) - R(1,2) > TH9$

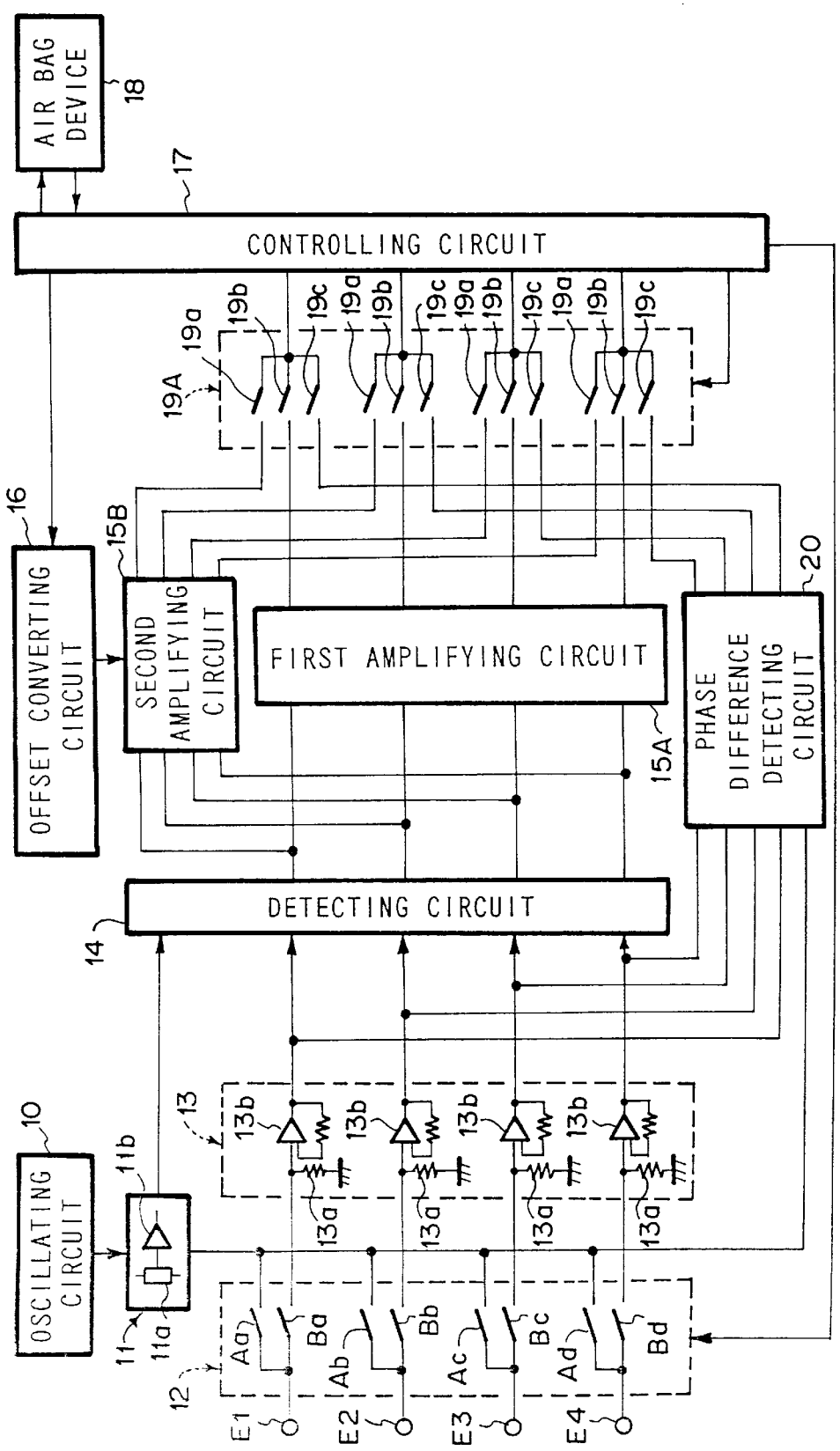
F I G.18

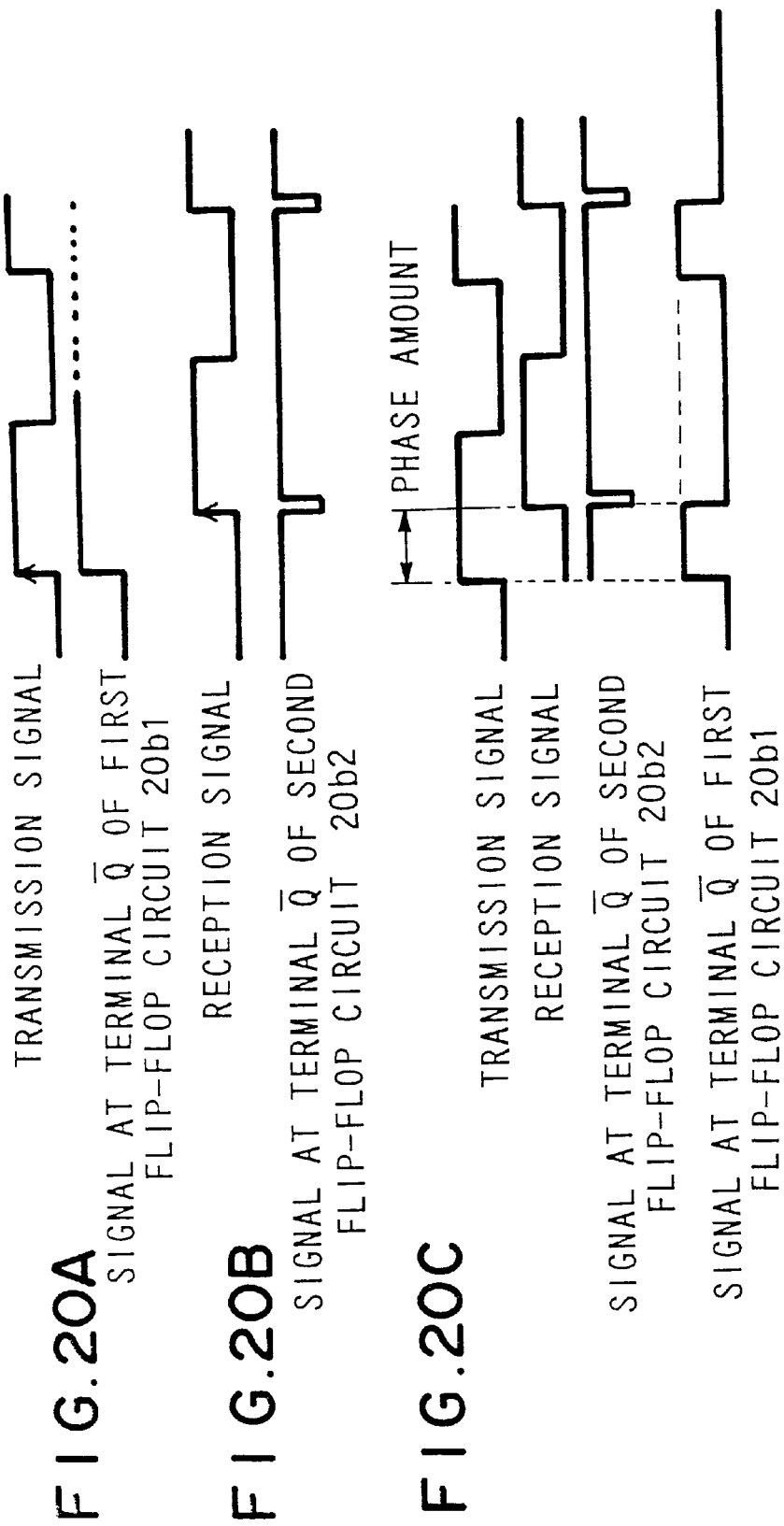

PASSENGER DETECTING SYSTEM AND PASSENGER DETECTING METHOD

BACKGROUND OF THE INVENTION

1. Field of the Invention

The present invention relates to a passenger detecting system and a passenger detecting method, in particular, to a passenger detecting system and a passenger detecting method for placing an air bag of an air bag device in an inflatable state or a non-inflatable state corresponding to a seating pattern of a passenger or the like on an assistant driver's seat of a car.

2. Description of the Related Art

Generally, an air bag device is used to alleviate the shock to a passenger in a car in case of a collision as a safety device. In recent years, air bag devices are installed for an assistant driver's seat as well as a driver's seat.

As shown in FIG. 24, such an air bag device comprises a driver's seat side squib circuit, an assistant driver's seat side squib circuit, an electronic acceleration sensor (collision detecting sensor) GS, and a controlling circuit CC. The driver's seat side squib circuit is composed of a safety sensor SS1, a squib SQ1, and a semiconductor switching device SW1 (such as an electric field effect transistor) that are connected in series. The assistant driver's seat side squib circuit is composed of a safety sensor SS2, a squib SQ2, and a semiconductor switching device SW2 (such as an electric field effect transistor). The controlling circuit CC determines whether a collision takes place corresponding to an output signal of an electronic acceleration sensor (shock detecting sensor) GS and supplies the resultant signal to the gates of the semiconductor switching devices SW1 and SW2.

In the air bag device, in case of a collision of the car due to any pause, the switch contacts of the safety sensors SS1 and SS2 are closed by relatively weak acceleration, thereby placing the driver's seat side squib circuit and the assistant driver's seat side squib circuit in an operable state. When the controlling circuit CC determines that the car has collided corresponding to an output signal of the electronic acceleration sensor GS, the controlling circuit CC supplies signals to the gates of the semiconductor switching devices SW1 and SW2 causing the switching devices SW1 and SW2 to be turned on. Since currents flow in the respective squib circuits, the squibs SQ1 and SQ2 become hot, thereby causing the driver's seat side air bag and the assistant driver's seat side air bag to inflate. Thus, the passengers in the car are protected from the shock of the collision.

In the air bag device, as shown in FIG. 25A, when an adult P sits on a seat 1, in event of a collision, the passenger protection effect can be expected. However, as shown in FIG. 25B, when an infant SP sits on a child seat 2 that is secured to an assistant driver's seat 1 in such a manner that the infant SP faces the back rest of the assistant driver's seat (this seating pattern of the child seat is referred to as Rear Facing Infant Seat: RFIS), in case of a collision of the car, it is preferable not to cause the air bag to inflate. On the other hand, when an infant SP sits on the child seat 2 secured to the assistant driver's seat in such a manner that the infant SP faces the windshield of the car (this seating pattern of the child seat is referred to as Forward Facing Child Seat: FFCS), if the air bag inflates, the air bag may contact the face of the infant SP. Thus, as with the RFIS pattern, in case of a collision of the car, it is preferable not to cause the air bag to inflate.

To solve such problems, an air bag device as shown in FIG. 26 has been proposed. In this air bag device, a sensor SD that detects whether or not a passenger sits on the assistant driver's seat is disposed. A controlling circuit CC determines the seating pattern of a passenger on the assistant driver's seat and places the air bag in the inflatable state or non-inflatable state in case of a collision of the car. As examples of the sensor SD, a weight measuring sensor such as a piezoelectric device for measuring the weight and a CCD camera for photographing a passenger who sits on a seat and detecting whether the passenger is an adult P or an infant SP and whether the seating pattern of the passenger have been proposed.

When the weight measuring sensor is used, it is possible to determine whether a passenger on the seat is an adult P or an infant SP corresponding to weight categories. Corresponding to the measured result, the controlling circuit CC places the air bag in the inflatable state or non-inflatable state so as to prevent the passenger on the seat from be shocked in case of a collision. However, the weight of the passenger largely varies person by person. In addition, a fat infant may be heavier than a skinny person. Thus, the measured result of the weight measuring sensor is not accurate. In addition, with the weight measuring sensor, the controlling circuit CC cannot determine whether an infant sits on the seat in the RFIS pattern or FFCS pattern.

When the CCD camera is used, although the controlling circuit CC can accurately determine in what style a passenger sits on the seat, whether the passenger sits on the seat is an adult P or an infant SP, and whether an infant sits on a child seat in the RFIS pattern or FFCS pattern, the controlling circuit CC should process data photographed by the CCD camera and compare the resultant data with various patterns. Thus, the structure of the processing unit becomes complicated and the cost thereof becomes expensive.

SUMMARY OF THE INVENTION

Therefore, an object of the present invention is to provide a passenger detecting system that properly determines whether a passenger on a seat is an adult or an infant and whether the passenger sits on a child seat in the RFIS pattern or FFCS pattern and that can be structured at relatively low cost.

A first aspect of the present invention is a passenger detecting system, comprising a seat, a plurality of electrodes disposed at predetermined intervals on at least the front surface of the seat, an oscillating circuit for generating a weak electric field between at least one particular electrode (referred to as a first type electrode) of the electrodes and the other electrodes (referred to as second type electrodes), a current/voltage converting circuit for detecting displacement currents that flow corresponding to the weak electric field and for converting the displacement currents into respective voltages, and a controlling circuit for detecting a seating pattern of an passenger or the like on the seat corresponding to output signals of the current/voltage converting circuit.

A second aspect of the present invention is a passenger detecting system, comprising a seat, a plurality of electrodes disposed at predetermined intervals on at least the front surface of the seat, an oscillating circuit for generating a weak electric field between at least one particular electrode (referred to as a first type electrode) of the electrodes and the other electrodes (referred to as second type electrodes), a current/voltage converting circuit for detecting displacement currents that flow corresponding to the weak electric field and for converting the displacement currents into respective voltages, a controlling circuit for detecting a seating pattern of a passenger or the like on the seat corresponding to output signals of the current/voltage converting circuit, and an air bag device for inflating an air bag in case of a collision, wherein data corresponding to the detected result of the controlling circuit is sent to the air bag device so as to place the air bag of the air bag device in an inflatable state or a non-inflatable state.

A third aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), detecting displacement currents that flow corresponding to the weak electric field, and detecting a seating pattern of a passenger on the seat corresponding to the displacement currents.

A fourth aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), detecting displacement currents that flow corresponding to the weak electric field, detecting a seating pattern of a passenger on the seat, sending data corresponding to the detected result to an air bag device, and placing the air bag of the air bag device in an inflatable state or a non-inflatable state.

A fifth aspect of the present invention is a passenger detecting system, comprising a seat, a plurality of electrodes disposed at predetermined intervals on at least the front surface of the seat, a load current detecting circuit for detecting a load current that flows from the oscillating circuit to the first type electrode, a current/voltage converting circuit for detecting displacement currents that flow corresponding to the weak electric field generated between the first type electrode and the second type electrodes, and a controlling circuit for detecting a seating pattern of a passenger on the seat corresponding to output signals of the load current detecting circuit and the current/voltage converting circuit.

A sixth aspect of the present invention is a passenger detecting system, comprising a seat, a plurality of electrodes disposed at predetermined intervals on at least the front surface of the seat, a load current detecting circuit for detecting a load current that flows from the oscillating circuit to the first type electrode, a current/voltage converting circuit for detecting displacement currents that flow corresponding to the weak electric field generated between the first type electrode and the second type electrodes, a controlling circuit for detecting a seating pattern of a passenger on the seat corresponding to output signals of the load current detecting circuit and the current/voltage converting circuit, and an air bag device for inflating an air bag in case of a collision, wherein data corresponding to the detected result of the controlling circuit is sent to the air bag device so as to place the air bag of the air bag device in an inflatable state or a non-inflatable state.

A seventh aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), detecting displacement currents that flow corresponding to the weak electric field, detecting a load current that flows in an oscillating circuit that generates the weak electric field and in the first type electrode, and detecting a seating pattern of a passenger on the seat corresponding to the displacement currents and the load current.

An eighth aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), detecting displacement currents that flow corresponding to the weak electric field, detecting a load current that flows in an oscillating circuit that generates the weak electric field and in the first type electrode, detecting a seating pattern of a passenger on the seat corresponding to the displacement currents and the load current, sending data corresponding to the detected result to an air bag device, and placing the air bag of the air bag device in an inflatable state or a non-inflatable state.

A ninth aspect of the present invention is a passenger detecting system, comprising a seat, a plurality of electrodes disposed at predetermined intervals on at least the front surface of the seat, an oscillating circuit for generating a weak electric field between at least one particular electrode (referred to as a first type electrode) of the electrodes and the other electrodes (referred to as second type electrodes), a current/voltage converting circuit for detecting displacement currents that flow corresponding to the weak electric field and for converting the displacement currents into respective voltages, a transmission/reception switching circuit for selectively connecting the first type electrode as a transmission electrode and the second type electrodes as reception electrodes to the oscillating circuit and the current/voltage converting circuit, respectively, and a controlling circuit for detecting a seating pattern of an passenger or the like on the seat corresponding to output signals of the current/voltage converting circuit, wherein the transmission/reception switching circuit is controlled corresponding to an output signal of the controlling circuit.

A tenth aspect of the present invention is a passenger detecting system, comprising a seat, a plurality of electrodes disposed at predetermined intervals on at least the front surface of the seat, an oscillating circuit for generating a weak electric field between at least one particular electrode (referred to as a first type electrode) of the electrodes and the other electrodes (referred to as second type electrodes), a load current detecting circuit for detecting a load current that flows from the oscillating circuit to the first type electrode, a current/voltage converting circuit for detecting displacement currents that flow corresponding to the weak electric field and for converting the displacement currents into respective voltages, a transmission/reception switching circuit for selectively connecting the first type electrode as a transmission electrode and the second type electrodes as reception electrodes to the oscillating circuit and the oscillating circuit, respectively, a controlling circuit for detecting a seating pattern of an passenger or the like on the seat corresponding to output signals of the load current detecting circuit and the current/voltage converting circuit, and an air bag device for inflating an air bag in case of a collision, wherein the transmission/reception switching circuit is controlled corresponding to an output signal of the controlling circuit, and wherein data corresponding to the detected result of the controlling circuit is sent to the air bag device so as to place the air bag of the air bag device in an inflatable state or a non-inflatable state.

An eleventh aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), detecting displacement currents that flow corresponding to the weak electric field, switching the first type electrode as a transmission electrode and the second type electrodes as reception electrodes so as to detect the displacement currents thereof, and detecting a seating pattern of a passenger on the seat corresponding to the displacement currents.

A twelfth aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), switching the first type electrode as a transmission electrode and the second type electrodes as reception electrodes and so as to detect the displacement currents thereof, detecting a seating pattern of a passenger on the seat corresponding to the displacement currents, sending data corresponding to the detected result to an air bag device, and placing the air bag of the air bag device in an inflatable state or a non-inflatable state.

A thirteenth aspect of the present invention is a passenger detecting system, comprising a seat, a plurality of electrodes disposed at predetermined intervals on at least the front surface of the seat, an oscillating circuit for generating a weak electric field between at least one particular electrode of the electrodes as a transmission electrode and the other electrodes thereof as reception electrodes, a current/voltage converting circuit for detecting displacement currents that flow in the reception electrodes corresponding to the weak electric field generated between the transmission electrode and the reception electrodes and converting the displacement currents to respective voltages, a phase difference detecting circuit for detecting the phase difference between the phase of a signal sent from the oscillating circuit to the transmission electrode and the phases of output signals of the current/voltage converting circuit, and a controlling circuit for detecting a seating pattern of an passenger or the like on the seat corresponding to at least output signals of the phase difference detecting circuit.

A fourteenth aspect of the present invention is a passenger detecting system, comprising a seat, a plurality of electrodes disposed at predetermined intervals on at least the front surface of the seat, an oscillating circuit for generating a weak electric field between at least one particular electrode of the electrodes as a transmission electrode and the other electrodes thereof as reception electrodes, a load current detecting circuit for detecting a load current that flows from the oscillating circuit to the transmission electrode, a current/voltage converting circuit for detecting displacement currents that flow in the reception electrodes corresponding to the weak electric field generated between the transmission electrode and the reception electrodes and converting the displacement currents to respective voltages, a transmission/reception switching circuit for selectively connecting the transmission electrode and the reception electrodes to the oscillating circuit and the current/voltage converting circuit, respectively, a phase difference detecting circuit for detecting the phase difference between the phase of a signal sent from the oscillating circuit to the transmission electrode and the phases of output signals of the current/voltage converting circuit, a controlling circuit for detecting a seating pattern of an passenger or the like on the seat corresponding to output signals of the load current detecting circuit, the current/voltage converting circuit, and the phase difference detecting circuit, and an air bag device for inflating an air bag in case of a collision, wherein data corresponding to the detected result of the controlling circuit is sent to the air bag device so as to place the air bag of the air bag device in an inflatable state or a non-inflatable state.

A fifteenth aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), detecting displacement currents that flow corresponding to the weak electric field, switching the first type electrode as a transmission electrode and the second type electrodes as reception electrodes so as to detect the displacement currents thereof, detecting the phase differences between the phase of the transmission signal of the transmission electrode and the phases of the reception signals of the reception electrodes, and detecting a seating pattern of a passenger on the seat corresponding to the displacement currents and the phase difference.

A sixteenth aspect of the present invention is a passenger detecting method, comprising the steps of generating a weak electric field between at least one particular electrode (referred to as a first type electrode) of a plurality of electrodes disposed on a front surface of a seat and the other electrodes (referred to as second type electrodes), switching the first type electrode as a transmission electrode and the second type electrodes as reception electrodes and so as to detect the displacement currents thereof detecting the phase difference between the phase of the transmission signal of the transmission electrode and the phases of the reception signals as the displacement currents, detecting a seating pattern of a passenger on the seat corresponding to the displacement currents and the phase difference, sending data corresponding to the detected result to an air bag device, and placing the air bag of the air bag device in an inflatable state or a non-inflatable state.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 1A and 1B are schematic diagrams for explaining a basic operation of a passenger detecting system according to the present invention, FIG. 1A showing an electric field distribution between electrodes E1 and E2 FIG. 1B showing an electric field distribution between electrodes E1 and E2 in the case that an object is present therebetween;

FIG. 2 is a schematic diagram showing an equivalent circuit of FIG. 1B;

FIG. 5 is a block diagram showing the practical structure of the passenger detecting system shown in FIG. 4;

FIGS. 11A to 11E are tables showing output signals of transmission electrode and reception electrodes corresponding to individual seating patterns of the seat according to the present invention, FIG. 11A showing a matrix of transmission electrodes and reception electrodes, FIG. 11B showing output signals of transmission electrode and reception electrodes in the state shown in FIG. 7A to 7D, FIG. 11C showing output signals of transmission electrode and reception electrodes in the state shown in FIGS. 8A to 8D, FIG. 11D showing output signals of transmission electrode and reception electrodes in the state shown in FIGS. 9A to 9D, FIG. 11E showing output signals of transmission electrode and reception electrodes in the state shown in FIGS. 10A to 10D;

FIG. 12 shows a calculating expression for determining the FFCS pattern of the seat according to the present invention;

FIG. 18 is a block diagram showing a passenger detecting system according to another embodiment of the present invention;

FIGS. 20A to 20C are schematic diagrams for explaining a phase detecting operation of the phase detecting circuit shown in FIG. 19A, FIG. 20A showing the waveform of an output signal of a first flip-flop circuit, FIG. 20B showing the waveform of an output signal of a second flip-flop circuit, FIG. 20C showing a phase difference between phases of the output signals of the first flip-flop circuit and the second flip-flop circuit;

FIG. 25A showing a seating pattern in the case that an adult passenger sits on a seat, FIG. 25B showing an RFIS pattern, FIG. 25C showing an FFCS pattern.

DESCRIPTION OF PREFERRED EMBODIMENTS

Next, with reference to FIGS. 1 and 2 the theory of the present invention will be described. In the passenger detecting system according to the present invention, the disturbance of a weak electric field generated between two electrodes disposed on a seat is used. As shown in FIG. 1A, an oscillating circuit 10 that generates a low voltage at high frequency is connected to an electrode E1. In addition, an electrode E2 is connected to the ground. Thus, an electric field takes place between the electrodes E1 and E2 due to a potential therebetween. As a result, a displacement current Id flows in the electrode E2. In this situation, when an object OB is present in the electric field, the electric field gets disturbed and thereby a displacement current Id1 that is different from the displacement current Id flows in the electrode E2. Any object OB can be electrically represented by conductance and capacitance. The object OB is connected to the ground through capacitance C. At this point, a current flows as in FIG. 2.

When an object OB is not present on a seat of a car, a shunting current that flows to the ground is almost zero. In contrast, a transmitting current (displacement current) that flows in the electrode E2 increases. When an object is present on the seat, as shown in FIG. 2, since a shunting current flows, a transmitting current that flows in the electrode E2 decreases. Thus, using this phenomenon, the seating pattern of a passenger on a seat can be detected. In particular, as the number of electrodes increases, the amount of information of an object (including a passenger) on the seat increases. Thus, the seating pattern of a passenger on a seat can be more accurately detected. Referring to FIG. 2, when an object is not present on the seat, a current path is formed from an oscillating circuit 10 that generates a low voltage at high frequency to a register 13a connected from an electrode E2 and the ground through a capacitor C1 formed between an electrode E1 connected to the oscillating circuit 10 and the electrode E2. When an object OB is present on the seat, a capacitor C2 is formed between the electrode E1 and the object OB. A capacitor C3 is formed between the object OB and the electrode E2 In addition, a capacitor C4 is formed between the object OB and the ground. A shunting current flows in the capacitor C2. A transmitting current (displacement current) flows in the capacitor C3. A current that is the difference between the shunting current and the transmitting current (displacement current) flows in the capacitor C4. A voltage caused by a current that flows in the resistor 13a is inversely amplified by an operational amplifier 13b of a receiving portion.

Figure 3:
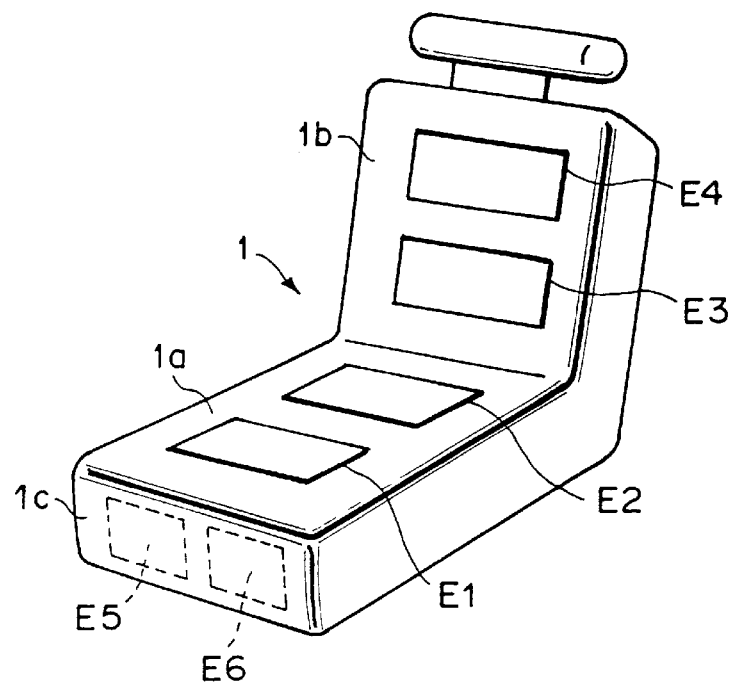
FIG. 3 is a perspective view showing a seat of the passenger detecting system according to the present invention.
Figure 24:
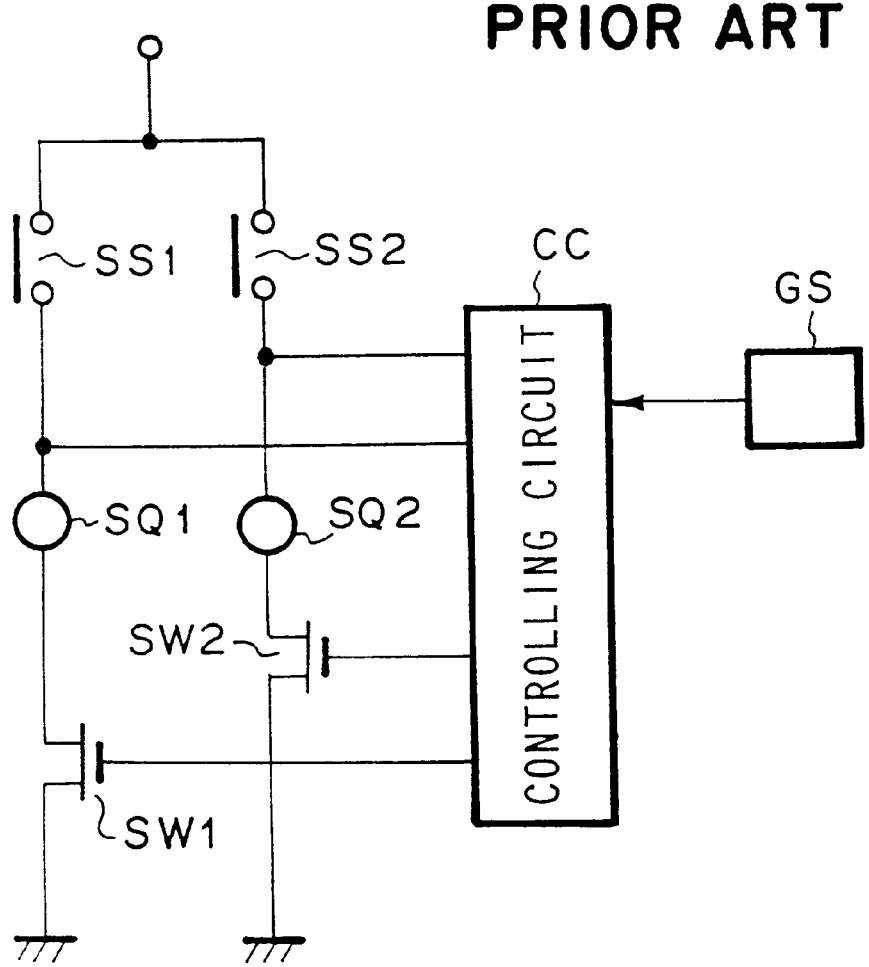
FIG. 24 is a block diagram showing the structure of an air bag device according to a related art reference.
Figure 25A:
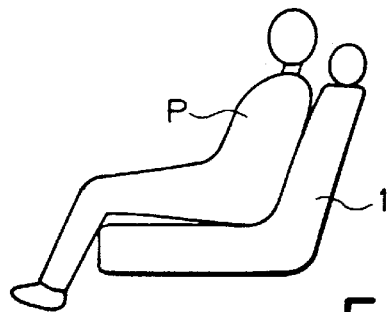
FIGS. 25A to 25C are schematic diagrams showing various seating patterns.
Figure 25B:
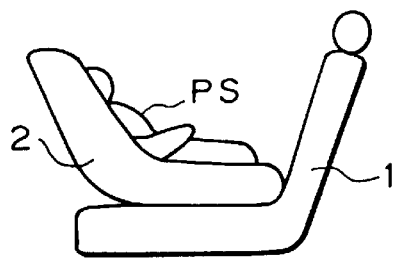
Figure 25C:
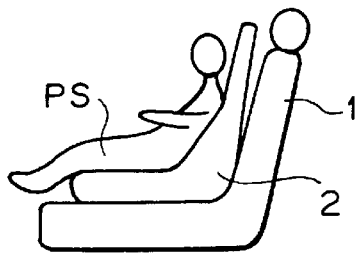
Figure 26:
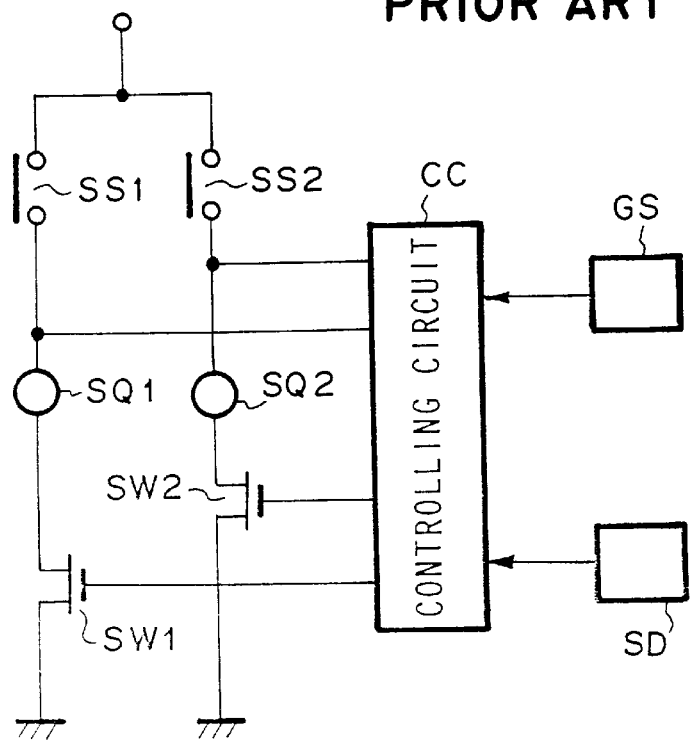
FIG. 26 is a block diagram showing a modified air bag device as another related art reference.

Next, with reference to FIGS. 3 to 6, a passenger detecting system according to the present invention using the above-described theory will be described. For simplicity, in FIGS. 3 to 6 similar portions to those in the related art reference shown in FIGS. 24 to 26 are denoted by similar reference numerals and their description will be omitted. FIG. 3 shows a seat according to the present invention. In this example, the seat shown in FIG. 3 is an assistant driver's seat. However, the seat may be a rear seat. In particular, a plurality of electrodes E1 to E6 are disposed on the front surface of the assistant driver's seat 1. In reality, rectangular electrodes E1 and E2 are disposed on a seat 1a. Electrodes E3 and E4 that have the same shape as the electrodes E1 and E2 are disposed on a back rest 1b. When necessary, electrodes E5 and E6 may be disposed on a front surface 1c. These electrodes are composed of conductive cloths so that the passenger can feel comfortable. Alternatively, metal strings may be woven into a seat cloth. As another alternative manner, conductive paint may be coated on a cloth. As a further alternative manner, a metal plate may be disposed. These electrodes E1 to E4 are connected to a circuit shown in FIG. 4 (FIG. 5).

Figure 4:
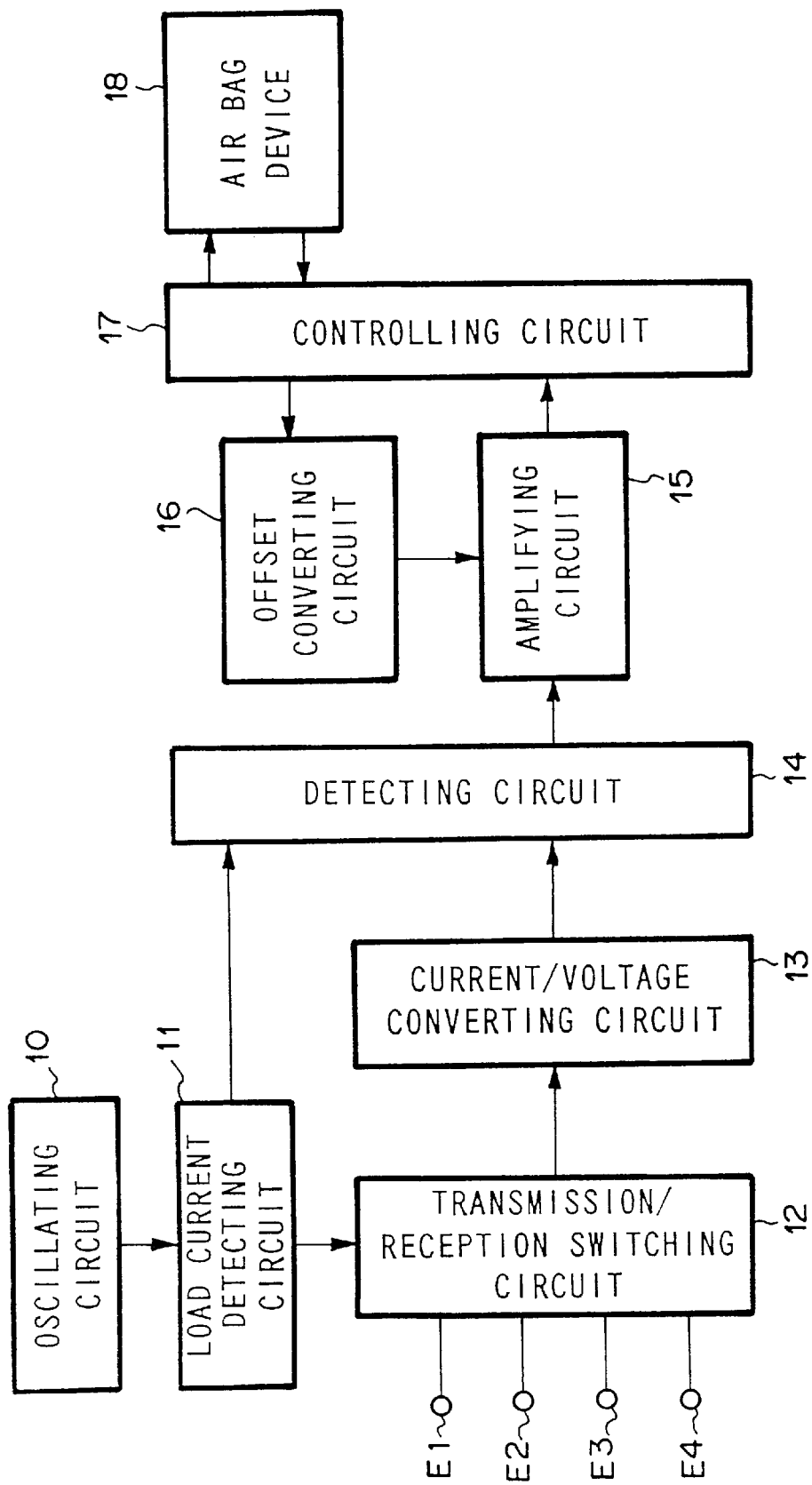
FIG. 4 is a block diagram showing the passenger detecting system according to the present invention.
Figure 7A:
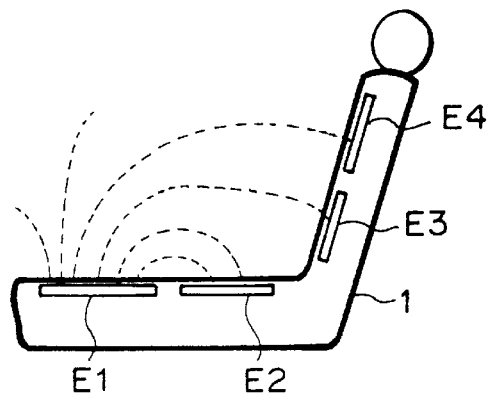
FIGS. 7A to 7D are schematic diagrams showing electric field distributions among electrodes in the case that no passenger sits on the seat according to the present invention, FIG. 7A showing an electric field distribution in the case that an electrode E1 is a transmission electrode and electrodes E2 to E4 are reception electrodes, FIG. 7B showing an electric field distribution in the case that the electrode E2 is a transmission electrode and the electrodes E1, E3 and E4 are reception electrodes, FIG. 7C showing an electric field distribution in the case that the electrode E3 is a transmission electrode and the electrodes E1, E2 and E4 are reception electrodes, FIG. 7D showing an electric field distribution in the case that the electrode E4 is a transmission electrode and the electrodes E1, E2, and E3 are reception electrodes.
Figure 7B:
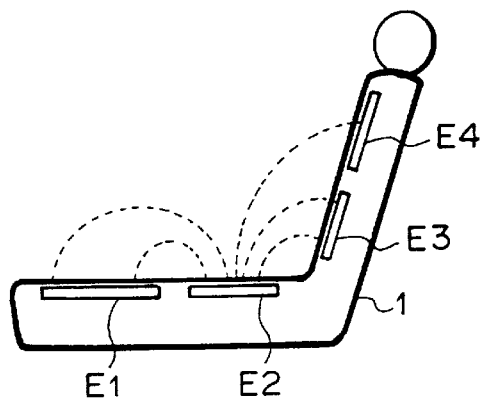
Figure 7C:
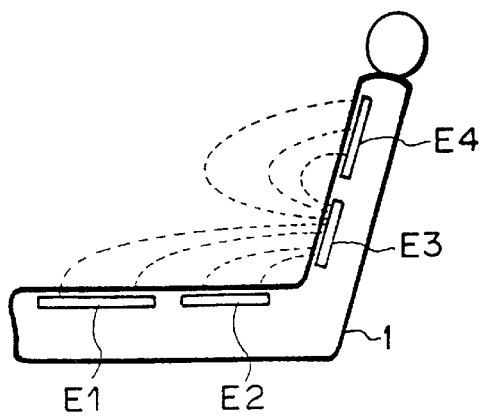
Figure 7D:
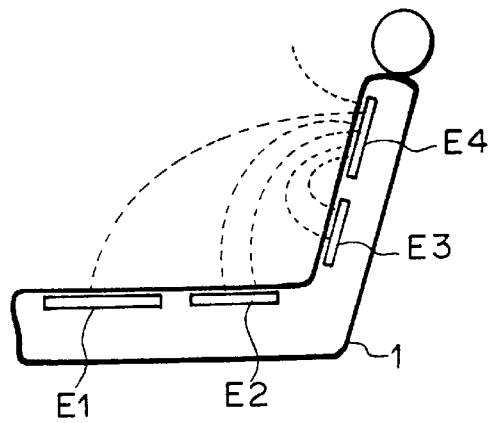
Figure 8A:
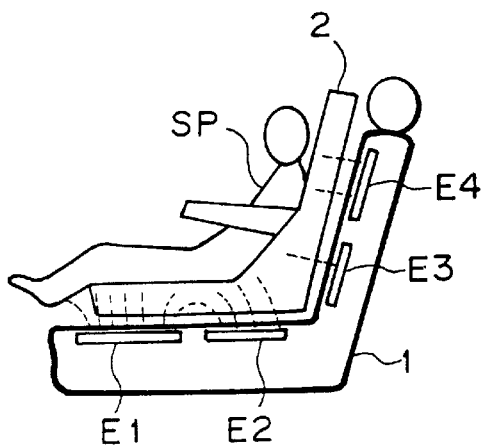
FIGS. 8A to 8D are schematic diagrams showing electric field distributions among electrodes in the case that an infant sits on a child seat secured to the seat according to the present invention in the FFCS pattern, FIG. 8A showing an electric field distribution in the case that an electrode E1 is a transmission electrode and electrodes E2 to E4 are reception electrodes, FIG. 8B showing an electric field distribution in the case that the electrode E2 is a transmission electrode and the electrodes E1, E3, and E4 are reception electrodes, FIG. 8C showing an electric field distribution in the case that the electrode E3 is a transmission electrode and the electrodes E1, E2, and E4 are reception electrodes, FIG. 8D showing an electric field distribution in the case that the electrode E4 is a transmission electrode and the electrodes E1, E2, and E3 are reception electrodes.
Figure 8B:
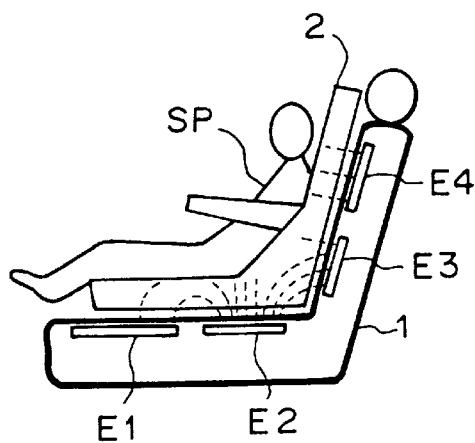
Figure 8C:
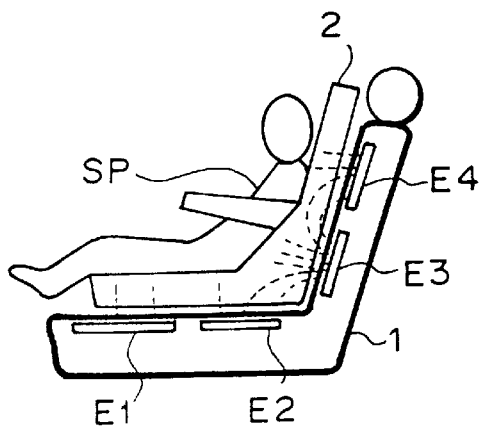
Figure 8D:
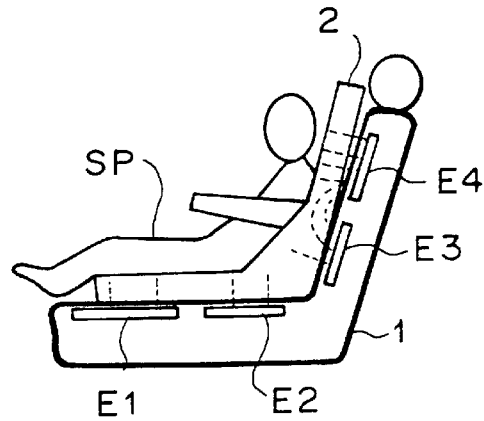
Figure 9A:
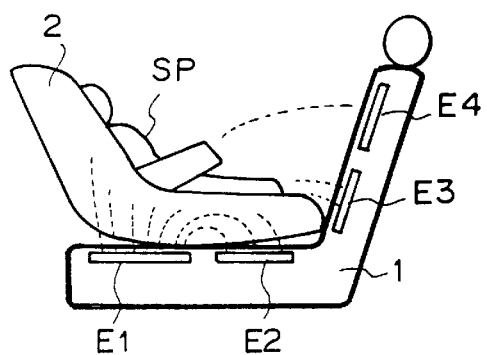
FIGS. 9A to 9D are schematic diagrams showing electric field distributions among electrodes in the case that an infant sits on a child seat secured to the seat according to the present invention in the RFIS pattern, FIG. 9A showing an electric field distribution in the case that an electrode E1 is a transmission electrode and electrodes E2 to E4 are reception electrodes, FIG. 9B showing an electric field distribution in the case that the electrode E2 is a transmission electrode and the electrodes E1, E3 and E4 are reception electrodes, FIG. 9C showing an electric field distribution in the case that the electrode E3 is a transmission electrode and the electrodes E1, E2, and E4 are reception electrodes, FIG. 9D showing an electric field distribution in the case that the electrode E4 is a transmission electrode and the electrodes E1, E2, and E3 are reception electrodes.
Figure 9B:
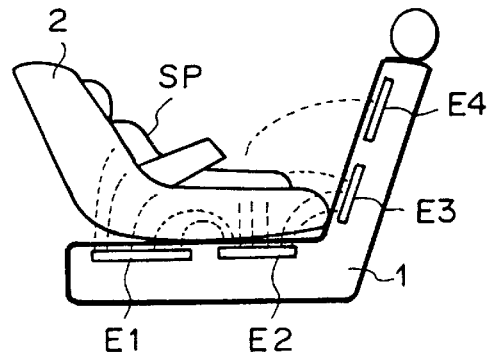
Figure 9C:
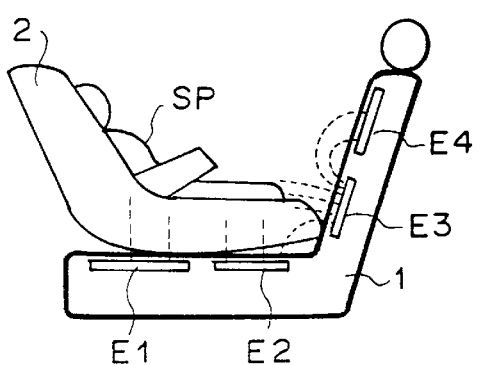
Figure 9D:
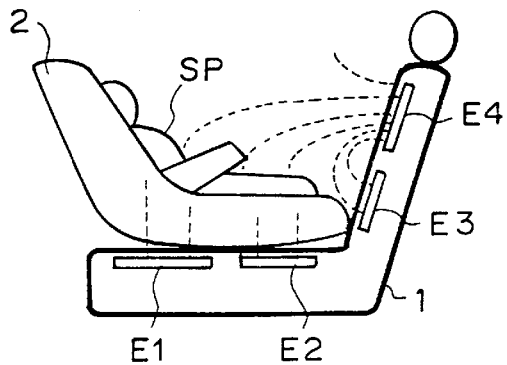
Figure 10A:
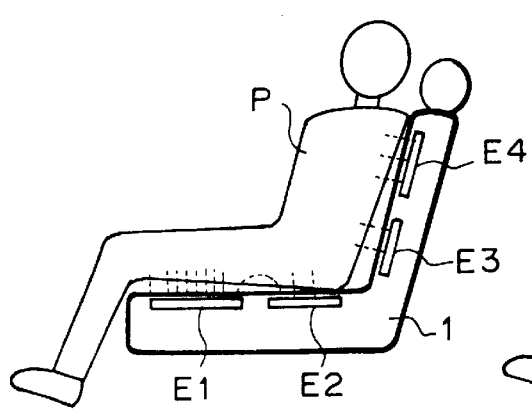
FIGS. 10A to 10D are schematic diagrams showing electric field distributions among electrodes in the case that an adult sits on the seat according to the present invention, FIG. 10A showing an electric field distribution in the case that an electrode E1 is a transmission electrode and electrodes E2 to E4 are reception electrodes, FIG. 10B showing an electric field distribution in the case that the electrode E2 is a transmission electrode and the electrodes E1, E3, and E4 are reception electrodes, FIG. 10C showing an electric field distribution in the case that the electrode E3 is a transmission electrode and the electrodes E1, E2, and E4 are reception electrodes, FIG. 10D showing an electric field distribution in the case that the electrode E4 is a transmission electrode and the electrodes E1, E2, and E3 are reception electrodes.
Figure 10B:
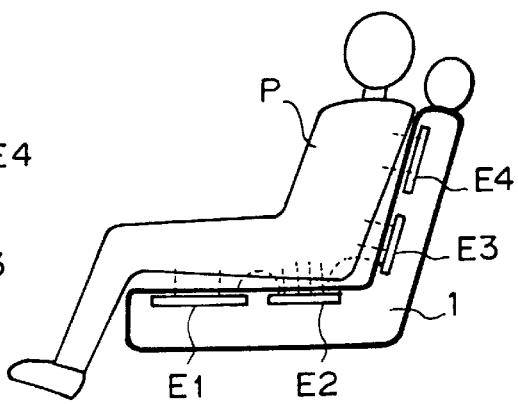
Figure 10C:
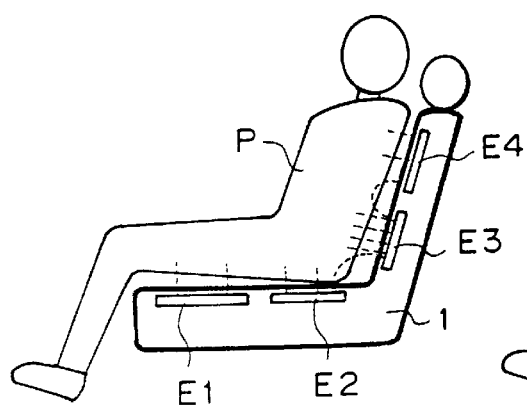
Figure 10D:
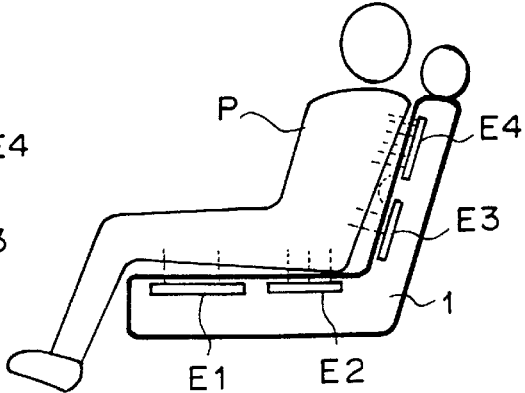

In FIG. 4, the passenger detecting system comprises an oscillating circuit 10, a load current detecting circuit 11, a transmission/reception switching circuit 12, a current/voltage converting circuit 13, a detecting circuit (demodulating circuit) 14, an amplifying circuit 15, an offset converting circuit 16, a controlling circuit 17, and an air bag device 18. The oscillating circuit 10 generates a low voltage at high frequency that ranges from for example 10 to 12 V at 100 kHz. The current/voltage converting circuit 13 has an amplifying function. The detecting circuit (demodulating circuit) 14 has a band-pass function and an AC/DC converting function (noise removing function). The controlling circuit 17 is composed of for example MPU. FIG. 5 shows a detail structure of the circuit shown in FIG. 4 The amplifying circuit 15 comprises a first amplifying circuit 15A, a second amplifying circuit 15B, an analog selecting circuit 19. The first amplifying circuit 15A and second amplifying circuit 15B amplify a gain G by one time and 100 times, respectively. The analog selecting circuit 19 selects output signals of the first amplifying circuit 15A and the second amplifying circuit 15B. The analog selecting circuit 19 is controlled by the controlling circuit 17.

In this system, the load current detecting circuit 11 comprises a resistor 11a and an amplifier 11b. The resistor 11a is for example an impedance device connected in series with the circuit. The amplifier 11b amplifies a terminal voltage of the resistor 11a. The load current detecting circuit 11 detects a current supplied to a selected electrode from the oscillating circuit 10 (this current is referred to as a load current or a transmission signal). The transmission/reception switching circuit 12 comprises first switching means Aa to Ad and second switching means Ba to Bd. The first switching means Aa to Ad connect an electrode selected from the electrodes E1 to E4 to the output side of the oscillating circuit 10 (the selected electrode is referred to as a transmission electrode). The second switching means Ba to Bd connect the electrodes other than the transmission electrode to the current/voltage converting circuit 13 (these electrodes are referred to as reception electrodes). The switching operations of the switching means are controlled by the controlling circuit 17. The transmission/reception switching circuit 12 can be composed of for example a multiplexer circuit.

The current/voltage converting circuit 13 comprises four registers 13a and four amplifiers 13b corresponding to the electrodes E1 to E4. Each of the registers 13a converts a displacement current that flows in each reception electrode into a voltage. Each of the amplifiers 13b amplitudes the converted voltage. The analog selecting circuit 19 comprises four first switching means 19a and four second switching means 19b. The four first switching means 19a are connected to the output side of the second amplifying circuit 15B. The four second switching means 19b are connected to the output side of the first amplifying circuit 15A. The analog selecting circuit 19 is preferably composed of for example a multiplexer circuit.

The system shown in FIGS. 4 and 5 operates as follows. Corresponding to an output signal of the controlling circuit 17, only the switching means Aa of the first switching means of the transmission/reception switching circuit 12 is connected to the output side of the oscillating circuit 10. In addition, the switching means Bb to Bd of the second switching means are connected to the current/voltage converting circuit 13. Thus, a low voltage at high frequency is applied from the oscillating circuit 10 to the transmission electrode E1. Displacement currents flow in the reception electrodes E2 to E4. The registers 13a convert the displacement currents into voltages. The voltages are amplified by the amplifiers 13b. The amplified voltages are supplied to the detecting circuit 14. On the other hand, a load current that flows in the transmission electrode E1 is detected by the load current detecting circuit 11 and supplied data R(1, 1) (that will be described later) to the detecting circuit 14. The detecting circuit 14 allows an input signal with a frequency of around 100 kHz to pass. In addition, the detecting circuit 14 removes an unnecessary noise component corresponding to the AC/DC converting function. Output signals of the detecting circuit 14 are sent to the first amplifying circuit 15A and the second amplifying circuit 15B. Output signals of the first amplifying circuit 15A and the second amplifying circuit 15B are properly selected corresponding to the operations of the offset converting circuit 16 and the analog selecting circuit 19. The selected signals are sent to the controlling circuit 17. When the output signals of the detecting circuit 14 can be measured in their full ranges, only the four second switching means 19b of the analog selecting circuit 19 are connected to the output side of the first amplifying circuit 15A. When the output signals of the detecting circuit 14 are weak and not measured in their full ranges, only the four first switching means 19a of the analog selecting circuit 19 are connected to the output side of the second amplifying circuit 15B. The controlling circuit 17 converts analog signals as the output signals of the first amplifying circuit 15A and the second amplifying circuit 15B into digital signals and stores the digital signals in a storing means of the controlling circuit 17.

Next, corresponding to an output signal of the controlling circuit 17, the switching means Aa of the first switching means of the transmission/reception switching circuit 12 is opened. Only the switching means Ab is connected to the output side of the oscillating circuit 10. In addition, the switching means Ba, Bc, and Bd of the second switching means are connected to the current/voltage converting circuit 13. Thus, a low voltage at high frequency is applied from the oscillating circuit 10 to the electrode E2. Consequently, displacement currents flow in the reception electrodes E1, E3, and E4. The resistors 13a converts the displacement currents into voltages. These voltages are amplified by the amplifiers 13b and supplied to the detecting circuit 14. A load current that flows in the transmission electrode E2 is detected by the load current detecting circuit 11 and sent as data R(2, 2) (that will be described later) to the detecting circuit 14. As with the above-described operation, the data is sent to the controlling circuit 17 through the analog selecting circuit 19 and then stored in the storing means of the controlling circuit 17.

Next, when only the first switching means Ac is connected to the output side of the oscillating circuit 10 and the switching means Ba, Bb, and Bd are connected to the current/voltage converting circuit 13, a low voltage at high frequency is applied from the oscillating circuit 10 to the transmission electrode E3 Displacement currents flow in the reception electrodes E1, E2, and E4. A load current that flows in the transmission electrode E3 is detected by the load current detecting circuit 11 and sent as data R(3, 3) (that will be described later) to the detecting circuit 14. As with the above-described operation, the data is sent to the controlling circuit 17 through the analog selecting circuit 19 and stored in the storing means of the controlling circuit 17.

When only the switching means Ad is connected to the output side of the oscillating circuit 10 and the switching means Ba, Bb, and Bc are connected to the current/voltage converting circuit 13, a low voltage at high frequency is applied from the oscillating circuit 10 to the transmission electrode E4. Displacement currents flow in the reception electrodes E1, E2, and E3. The resistors 13a convert the displacement currents into voltages. The voltages are amplified by the amplifiers 13b and sent to the detecting circuit 14. A load current that flows in the transmission electrode E4 is detected by the load current detecting circuit 11 and sent as data R(4, 4) (that will be described later) to the detecting circuit 14. As with the above-described operation, the resultant data is sent to the controlling circuit 17 through the analog selecting circuit 19 and stored in the storing means of the controlling circuit 17.

The controlling circuit 17 calculates such data and obtains a seating pattern corresponding to the detected data. The controlling circuit 17 has stored seating patterns. The controlling circuit 17 compares a seating pattern calculated corresponding to the reception signals and the transmission signal obtained from the reception electrodes and the transmission electrode E1 to E4 with the seating patterns that have been stored and extracts a relevant seating pattern. The controlling circuit 17 determines seating patterns shown in FIGS. 7A to 7D, 8A to 8D, 9A to 9D, and 10A to 10D. In reality, there are an empty pattern of which a passenger is not present on the seat 1 as shown in FIGS. 7A to 7D, an FFCS pattern of which an infant SP sits on the child seat 2 in the FFCS pattern as shown in FIGS. 8A to 8D, an RFIS pattern of which an infant SP sits on the child seat 2 in the RFIS pattern as shown in FIGS. 9A to 9D, and a person pattern of which an adult P sits on the seat 1 as shown in FIGS. 10A to 10D. With various combinations of the transmission electrode and the reception electrodes E1 to E4, data shown in FIGS. 11B to 11E is obtained. FIG. 11A shows a general expression R(i, j) where i represents a transmission electrode; j represents a reception electrode; i=j represents transmission data; and i≠j represents reception data. The controlling circuit 17 performs a calculating process using 16 data pieces for each pattern and extracts a feature of the seating pattern. When the controlling circuit 17 extracts a feature of for example the FFCS pattern, as shown in FIG. 12, the controlling circuit 17 compares various threshold values TH1 to TH9 with R(i, j). When the conditions shown in FIG. 12 are satisfied, the controlling circuit 17 determines that the extracted pattern is the FFCS pattern.

Figure 6:
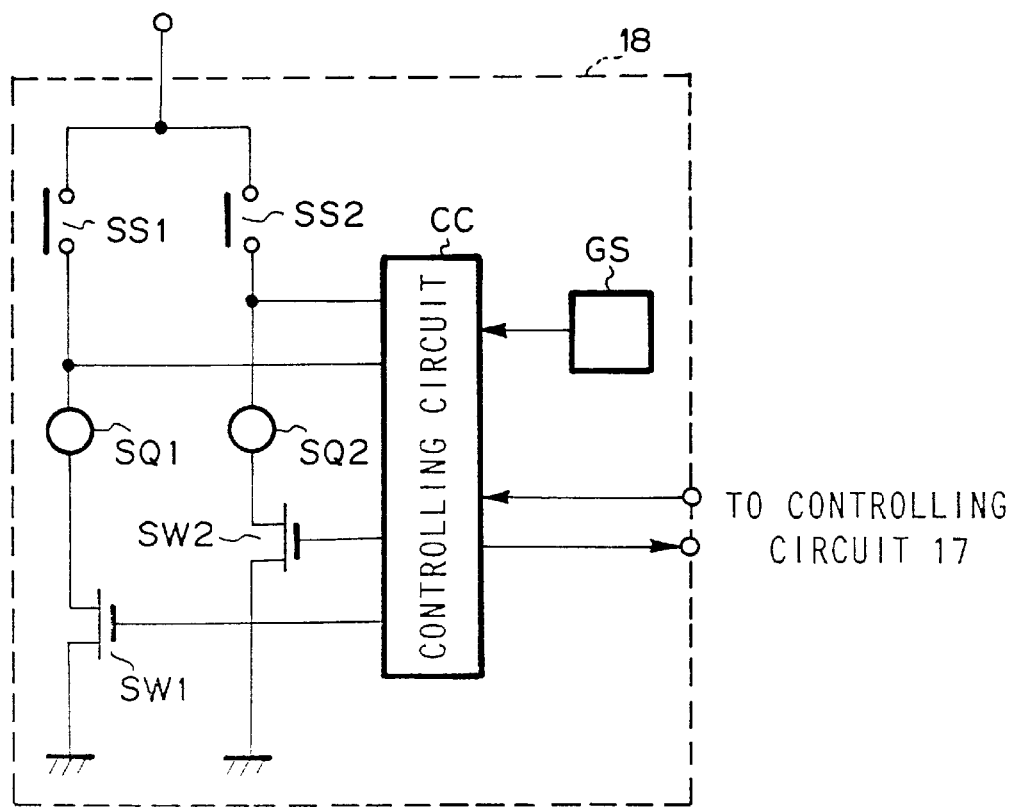
FIG. 6 is a block diagram showing the structure of an air bag device shown in FIG. 5.

When the controlling circuit 17 detects a seating pattern, it sends a relevant signal to the air bag device 18. When the seating pattern is the empty pattern, the FFCS pattern, or the RFIS pattern, the controlling circuit 17 sends to the air bag device 18 a signal that causes the air bag not to inflate in case of a collision. When the seating pattern is the person pattern, the controlling circuit 17 sends to the air bag device 18 a signal that causes the air bag to inflate in case of a collision. The output signal of the controlling circuit 17 is sent to a controlling circuit CC of the air bag device 18 as shown in FIG. 6. When the seating pattern is the empty pattern, the FFCS pattern, or the RFIS pattern, the controlling circuit 17 does not send a gate signal to the switching device SW2 on the assistant driver's seat side in case of a collision. The controlling circuit 17 sends the gate signal to the switching device SW1 on the driver's seat side. When the seating pattern is the person pattern, the controlling circuit 17 sends gate signals to both the switching device SW1 and the switching device SW2.

According to the air bag device 18 when the car collides due to any cause, the switch contacts of the safety sensors SS1 and SS2 are closed corresponding to relatively small acceleration, thereby placing the squib SQ1 and the squib SQ2 in their operable states. When the controlling circuit CC determines that the car has collided corresponding to a signal received from the electronic acceleration sensor GS, the controlling circuit CC sends signals to the gates of the switching device SW1 and the switching device SW2 corresponding to the pattern received from the controlling circuit 17. Thus, the switching device SW1 and/or the switching device SW2 is turned on. Consequently, since currents flow in the squib circuits, the squib SQ1 and/or the squib SQ2 generate heat, thereby causing the air bag on the driver's seat side and/or the air bag on the assistant driver side to inflate and preventing the passengers) from being shocked.

Figure 13:
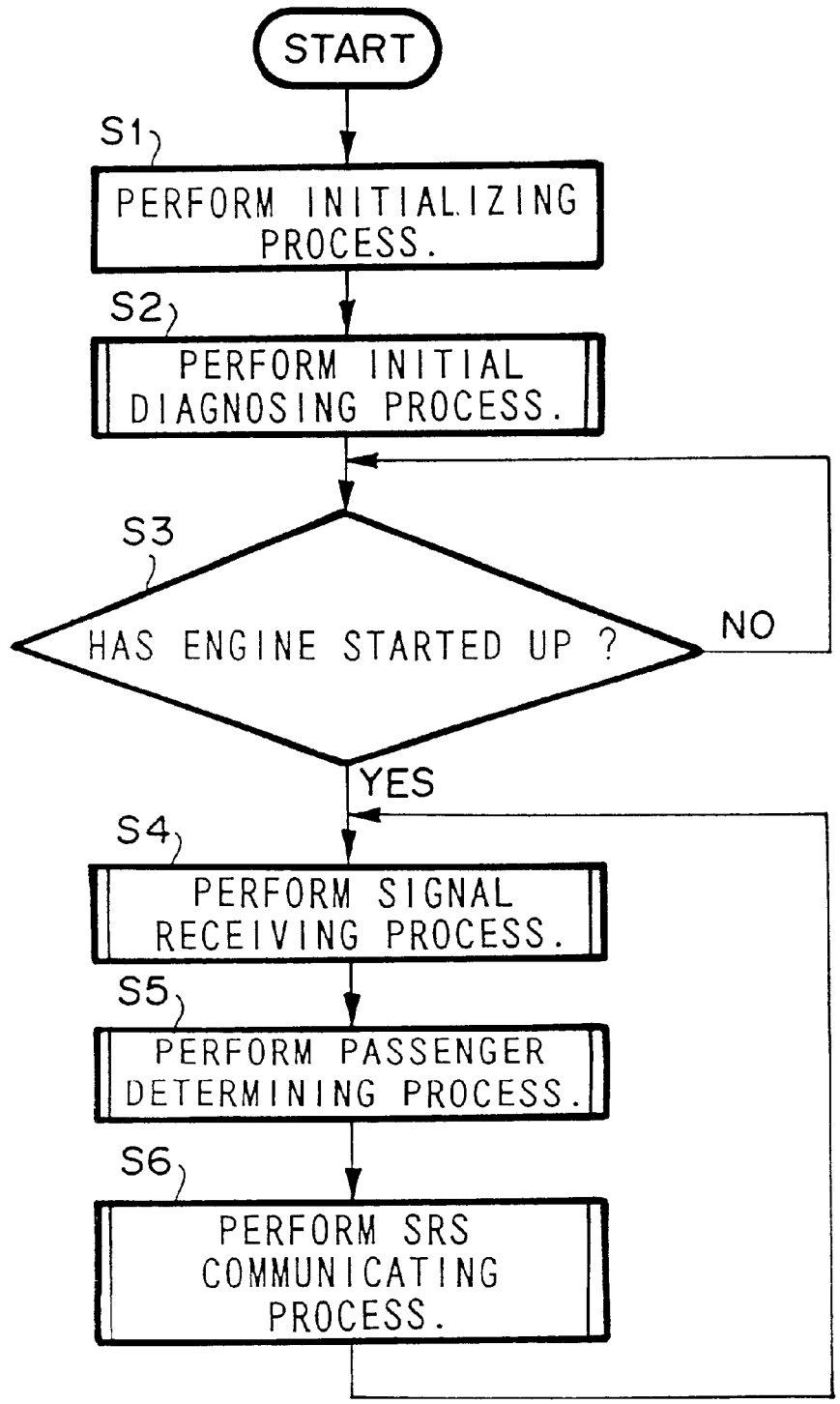
FIG. 13 is a flow chart showing a passenger detecting process according to a passenger detecting method according to the present invention.

Next, with reference to FIGS. 13 to 17 processes of the passenger detecting system will be described. As shown in FIG. 13, when the ignition switch of the car is turned on, the system starts up. At step S1, the system performs an initializing process. Thereafter, the flow advances to step S2. At step S2 the system performs an initial diagnosing process for the communication systems of the controlling circuit 17 and the air bag device 18. At step S3, the system determines whether or not the engine has been started up. When the determined result at step S3 is Yes, the flow advances to step S4. When the determined result at step S4, is No, the system waits until the engine starts up. At step S4 the system performs a signal receiving process for receiving signals in combinations of a transmission signal and reception signals from the transmission electrode and reception electrodes. Thereafter, the flow advances to step S5. At step S5 the system performs a passenger determining process for comparing a seating pattern corresponding to the obtained signal with seating patterns stored in the controlling circuit 17. At step S6, the system performs an SRS (Supplemental Restraint System) communicating process. In the SRS communicating process, the controlling circuit 17 communicates with the air bag device 18 corresponding to the determined result at step S5. Thereafter, the flow returns to step S4.

Figure 14:
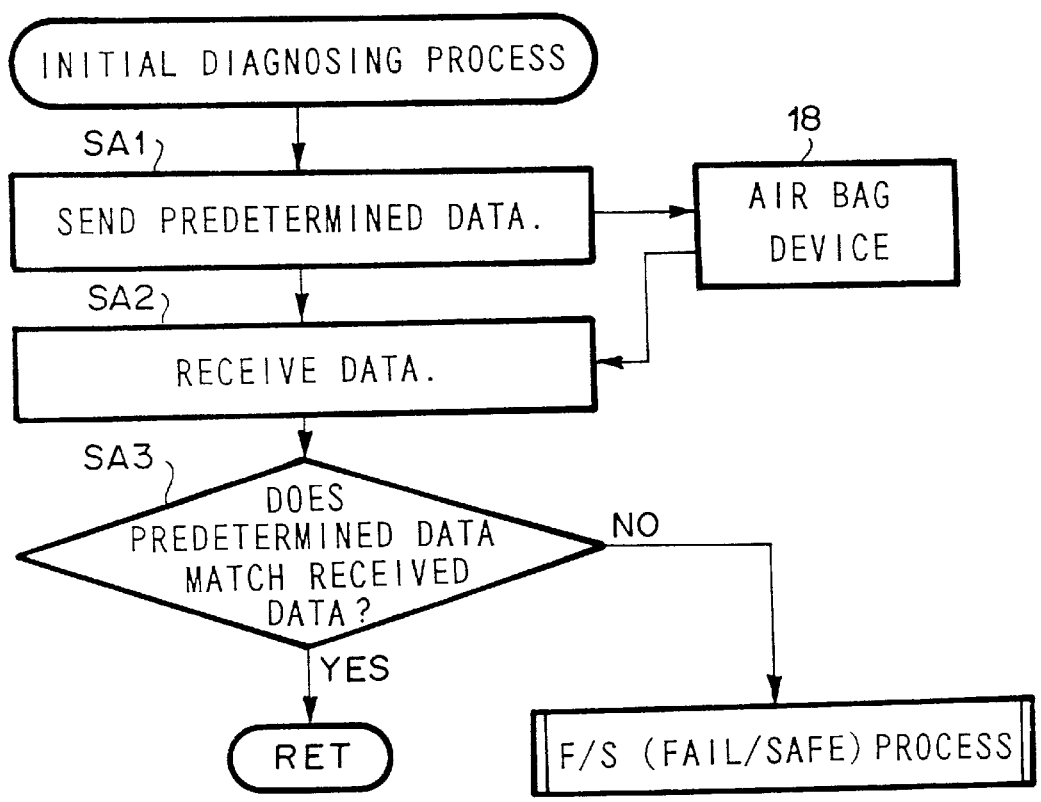
FIG. 14 is a flow chart showing an initial diagnosing process shown in FIG. 13.

FIG. 14 is a flow chart showing the initial diagnosing process shown in FIG. 13. At step SA1, the controlling circuit 17 sends predetermined data to the controlling circuit CC of the air bag device 18. At step SA2, the controlling circuit 17 receives data from the air bag device 18. At step SA3 the controlling circuit 17 determines whether or not the predetermined data matches the data received from the air bag device 18. When the determined result at step SA3 is Yes, the flow advances to step S3 shown in FIG. 13. When the determined result at step S14 is No, the controlling circuit 17 determines that the communication system has a problem and performs a fail safe process (for example, the controlling circuit 17 lights up an alarm lamp or the like). Alternatively, in the initial diagnosing process, the air bag device 18 may send to the controlling circuit 17. The controlling circuit CC of the air bag device 18 may determine whether the determined data matches the data received from the controlling circuit 17.

Figure 15:
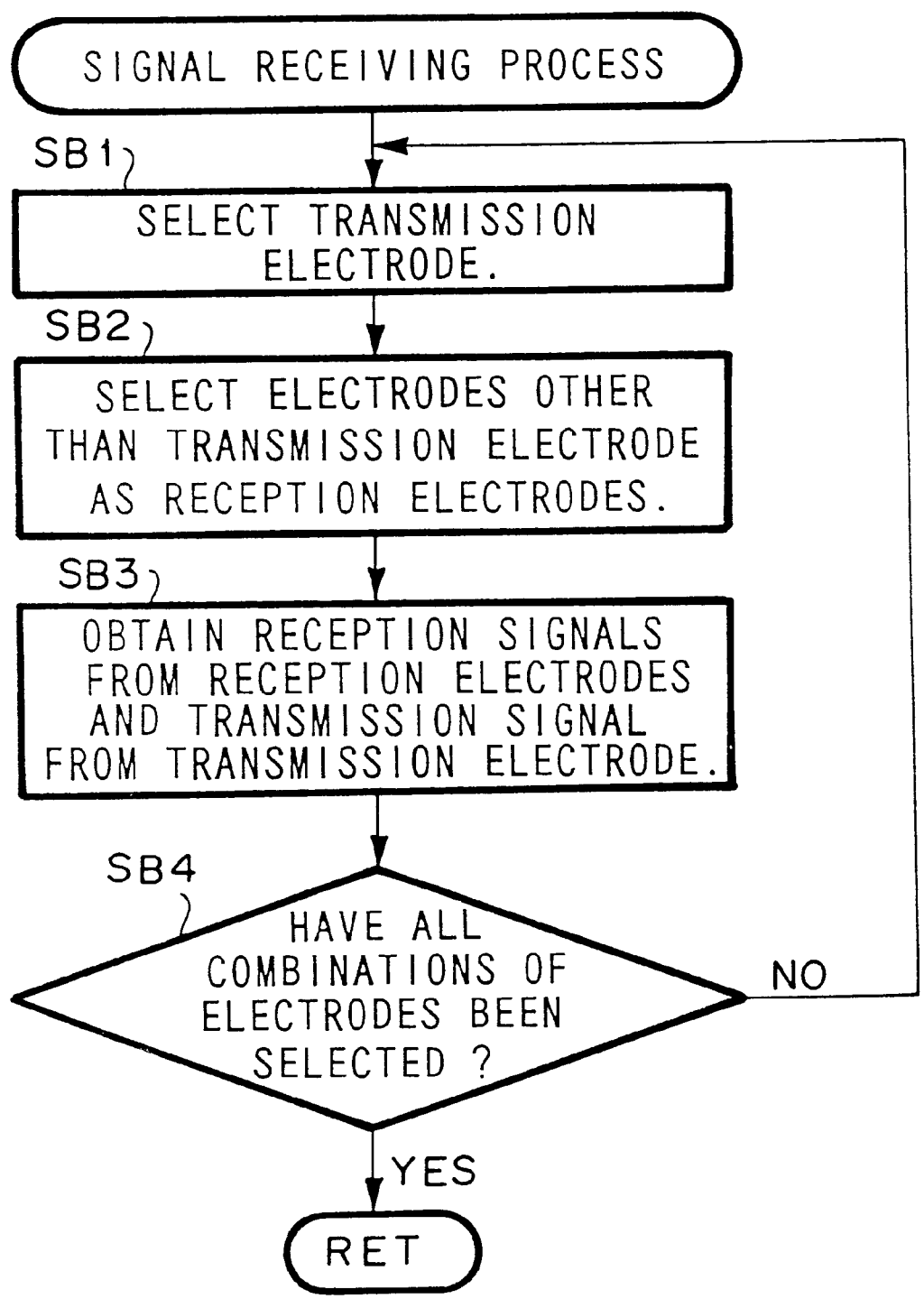
FIG. 15 is a flow chart showing a signal receiving process shown in FIG. 13.

FIG. 15 is a flow chart showing the signal receiving process shown in FIG. 13. At step SB1 the first switching means Aa to Ad select one electrode as a transmission electrode from the electrodes E1 to E4 disposed on the seat. At step SB2, the second switching means Ba to Bd select three electrodes other than the transmission electrode as reception electrodes. At step SB3, the controlling circuit 17 receives the reception signals from the reception electrodes and the transmission signal from the transmission electrode through the analog selecting circuit 19. These signals are stored in the storing means of the controlling circuit 17. At step SB4, the controlling circuit 17 determines whether or not all combinations of the electrodes E1 to E4 as a transmission electrode and reception electrodes have been selected. When the determined result at step SB4 is Yes, the flow advances to step S5 (the passenger determining process) shown in FIG. 13. When the determined result at step SB4 is No, the flow returns to step SB1. From step SB1, the system repeats the signal receiving process.

Figure 16:
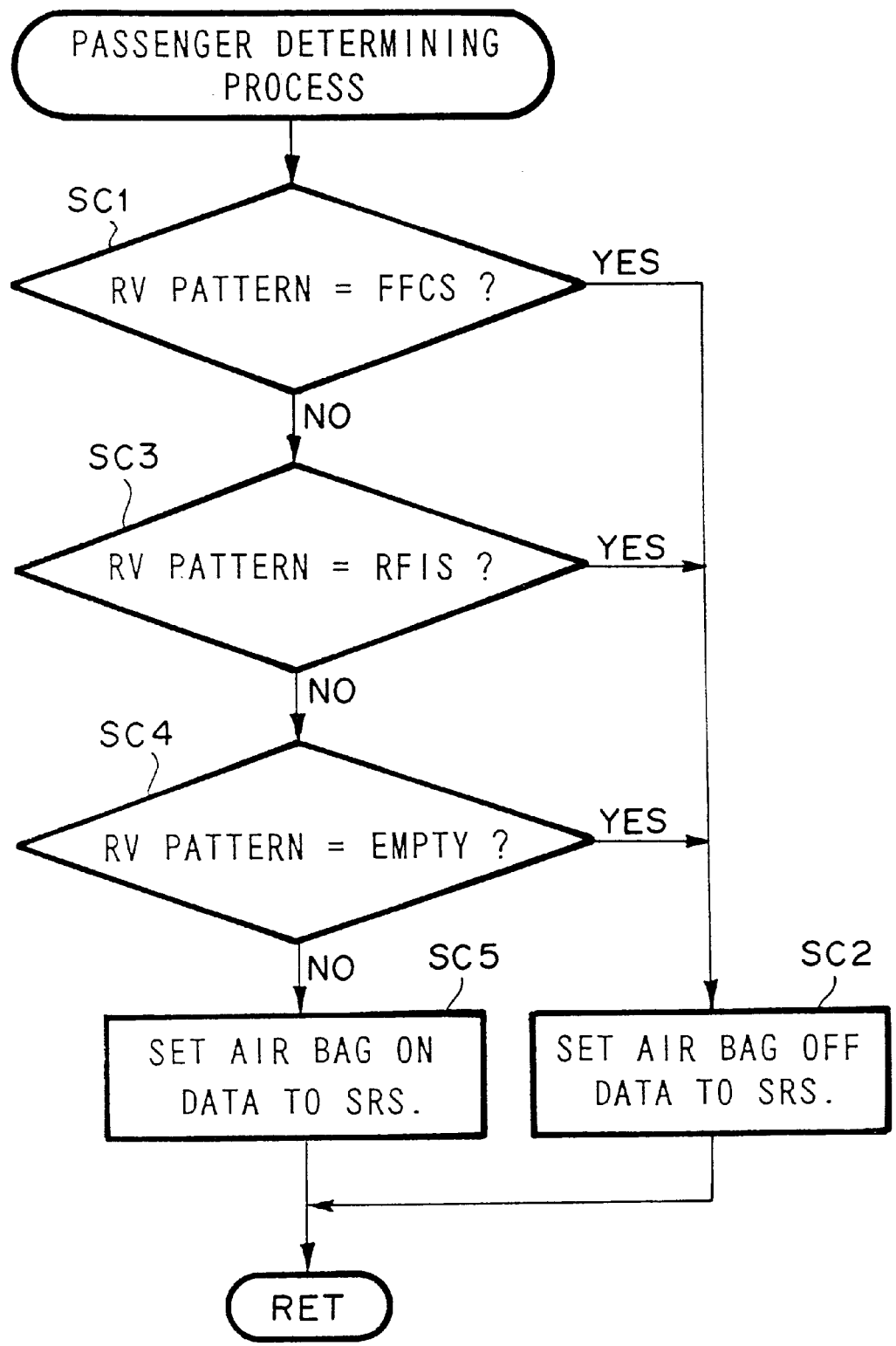
FIG. 16 is a flow chart showing a passenger determining process shown in FIG. 13.

FIG. 16 is a flow chart showing the passenger determining process shown in FIG. 13. At step SC1, the controlling circuit 17 determines whether a received pattern (RV pattern) as a seating pattern matches the FFCS pattern stored in the a controlling circuit 17. When the determined result at step SC2 is Yes, the flow advances to step SC2. At step SC2, the controlling circuit 17 sets air bag off data that causes the air bag of the air bag device 18 to be placed in a non-inflatable state. Thereafter, the flow advances to step S6 (SRS communicating process) shown in FIG. 13. When the determined result at step SC1 is No, the flow advances to step SC3. At step SC3, the controlling circuit 17 determines whether or not the received pattern of the seating pattern (RV pattern) matches the RFIS pattern stored in the controlling circuit 17. When the determined result at step SC3 is Yes, the flow advances to step SC2. At step SC2, the controlling circuit 17 sets the air bag off data. When the determined result at step SC3 is No, the flow advances to step SC4. At step SC4 the controlling circuit 17 determines whether or not the received pattern of the seating pattern matches the empty pattern stored in the controlling circuit 17. When the determined result at step SC4 is Yes, the flow advances to step SC2. At step SC2, the system sets the air bag off data. When the determined result at step SC4 is No, the flow advances to step SC5. At step SC5 the controlling circuit 17 sets air bag on data that causes the air bag of the air bag device 18 to be placed in the inflatable state. Thereafter, the flow advances to step S6 (SRS communicating process) shown in FIG. 13.

Figure 17:
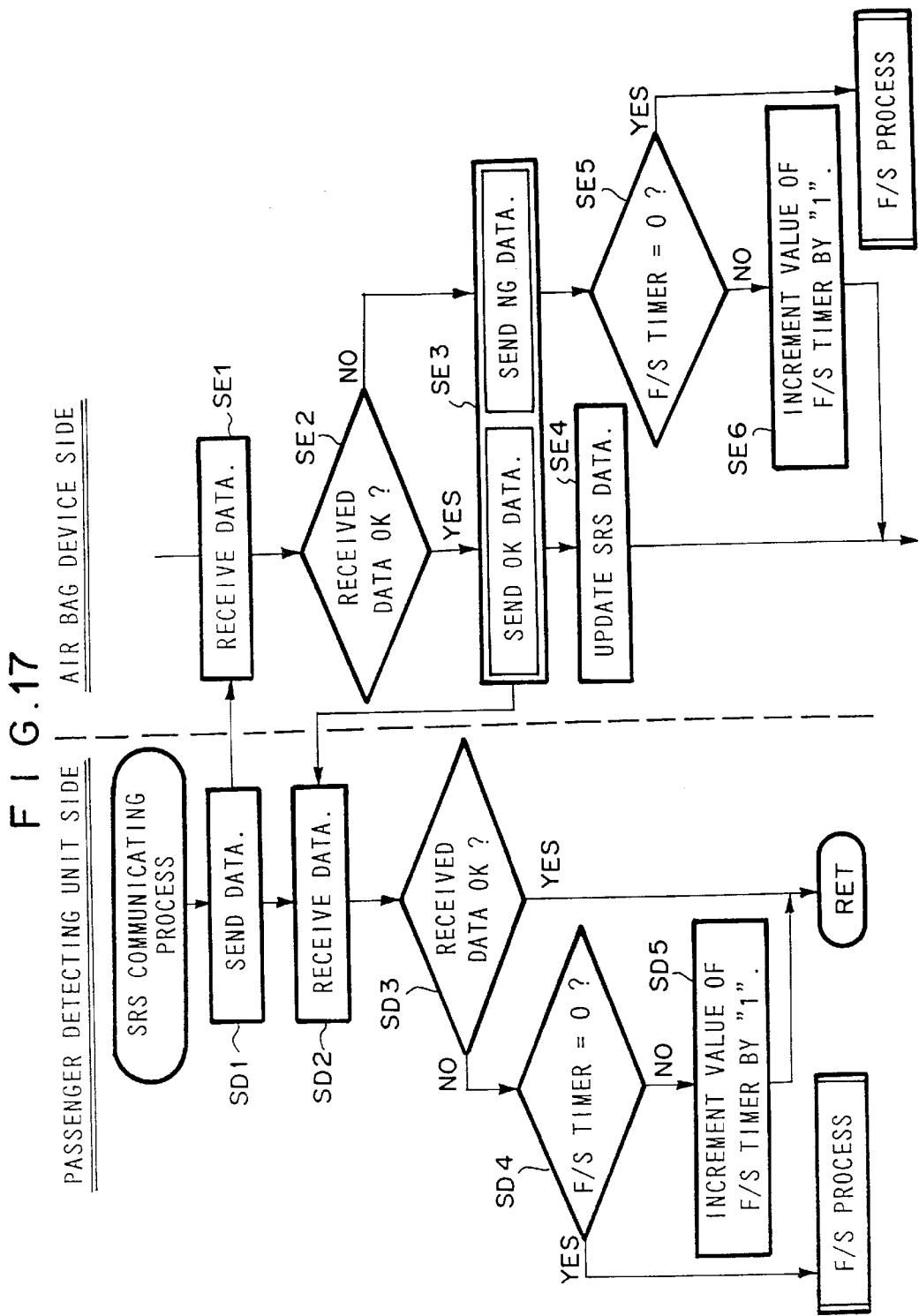
FIG. 17 is a flow chart showing an SRS communicating process shown in FIG. 13.

FIG. 17 is a flow chart showing the SRS communicating process shown in FIG. 13. At step SD1, a passenger detecting unit (controlling circuit 17) sends the air bag on data or the air bag off data and check data to the air bag device (controlling circuit CC). At step SD2, the passenger detecting unit receives OK data or NG data corresponding to the air bag on data or air bag off data and check data from the air bag device. Thereafter, the flow advances to step SD3. At step SD3, the passenger detecting unit determines whether or not the air bag device has sent back the OK data or NG data and the check data. When the determined result at step SD3 is Yes (namely, the communication system is normal), the flow returns to step S4 shown in FIG. 13. When the determined result at step SD3 is No, the flow advances to step SD4. At step SD4, the passenger detecting unit determines whether or not the value of the fail safe timer is "0". For example, the passenger detecting unit performs an abnormality detecting process three times. When the determined result at step SD4 is "0", the passenger detecting unit performs the fail safe process (for example, the passenger detecting unit lights up an alarm lamp or the like). When the determined result at step SD4 is No, the flow advances to step SD5. At step SD5, the passenger detecting unit increments the value of the fail safe counter by "1". Thereafter, the flow returns to step S4 shown in FIG. 13.

At step SE1, the air bag device (controlling circuit CC) receives the air bag on data or air bag off data and check data from the passenger detecting unit. At step SE2, the air bag device determines whether or not the air bag on data or air bag off data and the check data have been correctly received. Regardless of the determined result at step SE2, the flow advances to step SE3. At step SE3, the air bag device 18 sends OK data or NG data and check data to the passenger detecting unit. When the determined result at step SE2 is Yes, the air bag device 18 sends the OK data to the passenger detecting unit. Thereafter, the flow advances to step SE4. At step SE4, the air bag device 18 updates data of the controlling circuit CC corresponding to the OK data. Thus, the air bag device places the air bag in either the inflatable state or the non-inflatable state. When the determined result at step SE2 is No, the air bag device 18 sends the NG data to the passenger detecting unit. Thereafter, the flow advances to step SE5. At step SE5, the air bag device 18 determines whether or not the value of the fail safe timer is "0". For example, the air bag device 18 performs a communication system error detecting process three times. Thus, when the determined result at step SE5 is Yes, the air bag device 18 performs the fail safe process (for example, the air bag device 18 lights up an alarm lamp). When the determined result at step SE5 is No, the flow advances to step SE6. At step SE6, the air bag device 18 increments the value of the fail safe timer by "1". Thereafter, the flow returns to step S4 shown in FIG. 13.

According to the embodiment, a plurality of electrodes E1 to E4 are disposed on the front surface of the seat 1. A low voltage at high frequency is applied between one electrode selected as a transmission electrode and other electrodes as reception electrodes. Thus, since a weak electric field is generated, displacement currents flow in the reception electrodes corresponding to a seating pattern of a passenger on the seat 1. Consequently, by determining a feature pattern of the displacement currents, the seating pattern of the passenger can be accurately detected. Thus, the system can place the air bag of the air bag device in either the inflatable state or non-inflatable state.

In particular, a particular electrode (transmission electrode) connected to the oscillating circuit 10 and other electrodes (reception electrodes) connected to the current/voltage converting circuit 13 are selected by the switching operations of the first switching means Aa to Ad and the second switching means Ba to Bd of the transmission/reception switching circuit 12 controlled by the controlling circuit 17. Thus, the reception signals and the transmission signal can be promptly sent to the controlling circuit 17. In addition, much information can be obtained without need to increase the number of electrodes. Consequently, the seating pattern of the passenger can be accurately and properly determined.

When the controlling circuit 17 determines a seating pattern, the load current detecting circuit 11 detects a load current that flows in a transmission electrode. The detected signal as the transmission signal is sent to the controlling circuit 17 as well as the reception signals. Thus, since the number of data pieces increases, the controlling circuit 17 can accurately detect the seating pattern. Since the four electrodes E1 to E4 are disposed at predetermined intervals on the seat 1, as shown in FIG. 11A, there are 16 combinations of the transmission electrode and the reception electrodes. Thus, since 16 data pieces are obtained, the detecting performance and reliability of the seating pattern are improved.

In addition, since the controlling circuit 17 has stored patterns of currents that flow in individual electrodes corresponding to the four seating patterns shown in FIGS. 7A to 7D, 8A to 8D, 9A to 9D, and 10A to 10D, the controlling circuit 17 compares various signals obtained in combinations of a transmission electrode and reception electrodes by the transmission/reception switching circuit 12 with the predetermined seating patterns and extracts a relevant pattern. Thus, the controlling circuit 17 can accurately detect an actual seating pattern.

The above-described four seating patterns of a passenger can be properly determined. However, if the seat 1 gets wet, displacement currents that flow in the reception electrodes increase. Thus, it may be difficult to distinguish the seating pattern in this situation from the person pattern shown in FIGS. 10A to 10D.

In this case, a passenger detecting system shown in FIGS. 18 and 19 can be preferably used. The basic structure of the system shown in FIGS. 18 and 19 is the same as that of the system shown in FIGS. 4 and 5 except that the former system includes a phase detecting circuit 20 and a switching means 19c. The phase detecting circuit 20 detects a phase amount corresponding to an output signal of an oscillating circuit 10 and an output signal of a current/voltage converting circuit 13. The switching means 19c is disposed in an analog selecting circuit 19A. The switching means 19c selects an output signal of the phase detecting circuit 20. The analog selecting circuit 19A is controlled by a controlling circuit 17. The phase detecting circuit 20 detects the phase difference between the phase of the output signal of the oscillating circuit 10 and the phases of the output signals of the current/voltage converting circuit 13.

Figures 19A, 19B:
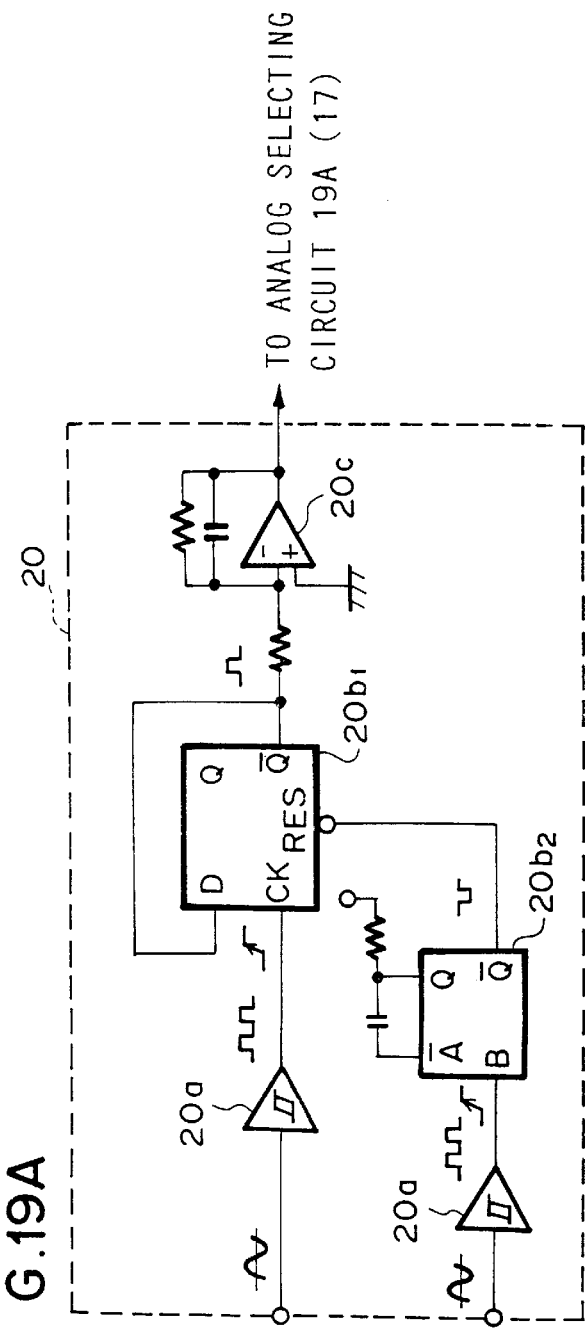
FIG. 19A is a circuit diagram showing a phase detecting circuit shown in FIG. 18.
FIG. 19B is a circuit diagram showing a waveform shaping circuit of the phase detecting circuit shown in FIG. 19A.

As shown in FIG. 19A, the phase detecting circuit 20 comprises two waveform shaping circuits 20a, a first flip-flop circuit 20b1, a second flip-flop circuit 20b2 and an integrating circuit 20c.

The system according to the this embodiment performs a phase detecting operation in the following manner. When a transmission signal and reception signals that are sine wave signals are sent to the waveform shaping circuits 20a, as shown in FIG. 20A, the sign wave signals are shaped as square wave signals. The resultant signals are sent to the first flip-flop circuit 20b1 and the second flip-flop circuit 20b 2. A leading edge (represented by an arrow) of the square wave signal of the transmission signal is detected at a terminal CK of the flip-flop circuit 20b1. Thus, the signal level at a terminal $\overline{Q}$ becomes high. On the other hand, as shown in FIG. 20B, a leading edge of the square wave of a reception signal is detected at a terminal B of the second flip-flop circuit 20b2. A one-shot pulse whose signal level is low is output from a terminal $\overline{Q}$ of the second flip-flop circuit 20b2. This signal is sent to a terminal RES of the first flip-flop circuit 20b1. Thus, the signal level of the terminal $\overline{Q}$ of the first flip-flop circuit 20b1 inversely becomes low as shown in FIG. 20C. The resultant signal is sent as a phase amount to the integrating circuit 20c. The integrating circuit 20c converts the input signal into a voltage that causes four switching means 19c of the analog selecting circuit 19 to be simultaneously selected and connected. The controlling circuit 17 converts the output signals of the first amplifying circuit 15A, the second amplifying circuit 15B, and the phase detecting circuit 20 as analog signals into digital signals. The resultant signals are stored as phase data in the storing means of the controlling circuit 17 along with other data. The phase data is sent to the controlling circuit 17 along with the reception signals and the transmission signal of the electrodes at step SB3 shown in FIG. 15.

In particular, since the phase detecting circuit 20 is disposed on the output side of the current/voltage converting circuit 13, the phase difference between the phase of the transmission signal and the phases of the reception signals can be easily detected corresponding to the output signal of the oscillating circuit 10 and the output signals of the current/voltage converting circuit 13 connected to the reception electrodes and transmission electrode. Thus, when the seat 1 gets wet, the transmission signal and the reception signals in this state vary from those in the person pattern shown in FIG. 10. Consequently, the wet pattern can be properly determined without confusion of the person pattern. Thus, more information can be obtained without need to unnecessarily increase the number of electrodes. Consequently, the seating pattern of a passenger and the state of the seat can be accurately and effectively determined.

Figure 21:
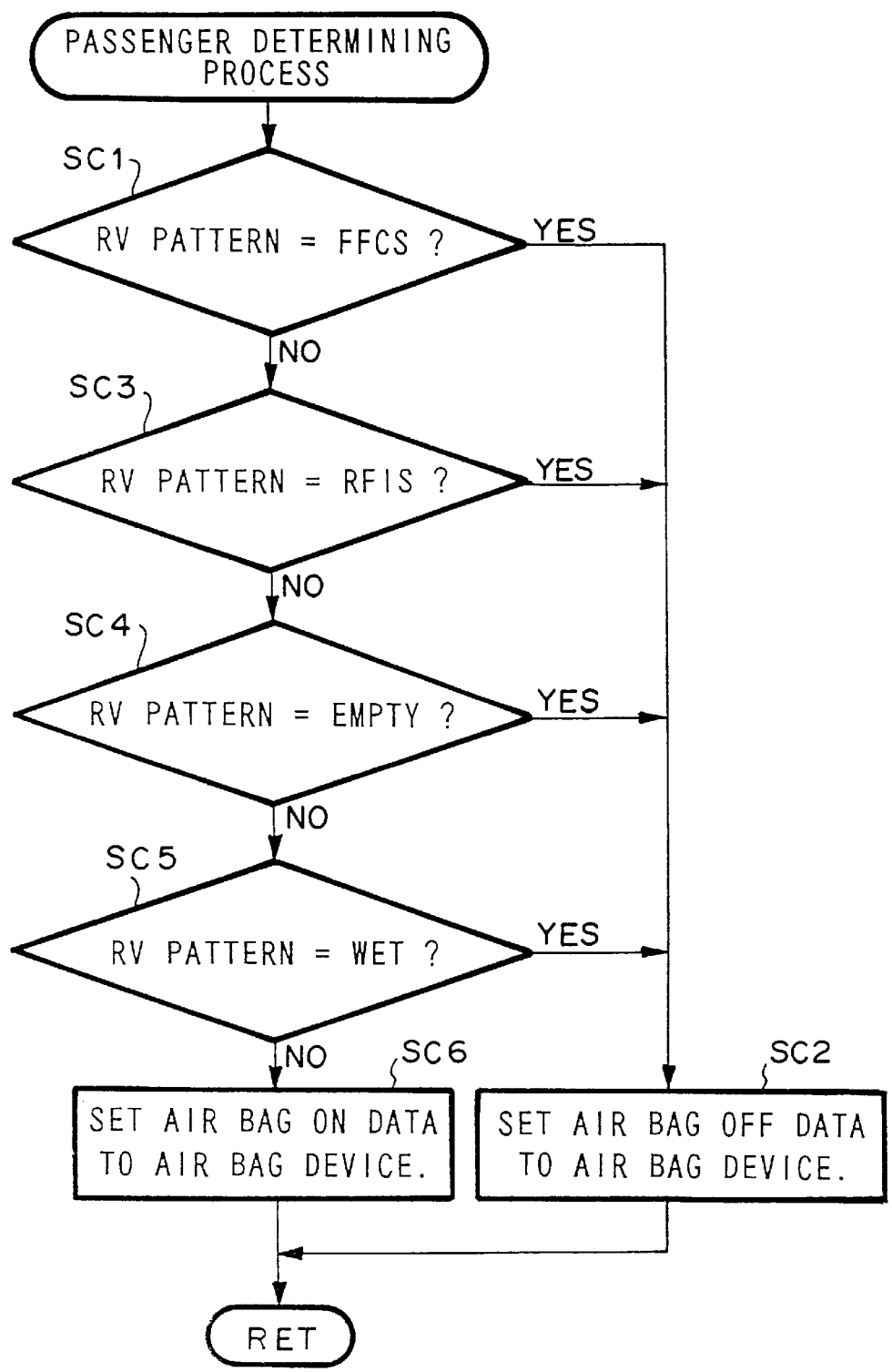
FIG. 21 is a flow chart showing a passenger determining process of the passenger detecting system shown in FIG. 18.

FIG. 21 is a flow chart showing a passenger determining process of the system shown in FIG. 18. At step SC1, the controlling circuit 17 determines whether or not the received pattern (RV pattern) of the seating pattern matches the FFCS pattern stored therein. When the determined result at step SC1 is Yes, the flow advances to step SC2. At step SC2, the system sets air bag off data that causes the air bag of the air bag device 18 to be placed in a non-inflatable state. Thereafter, the flow returns to step S6 (SRS communicating process) shown in FIG. 13. When the determined result at step SC1 is No, the flow advances to step SC3. At step SC3, the controlling circuit 17 determines whether or not the received pattern (RV pattern) of the seating pattern matches the RFIS pattern stored therein. When the determined result at step SC3 is Yes, the flow advances to step SC2. At step SC2, the system sets the air bag off data. When the determined result at step SC3 is No, the flow advances to step SC4. At step SC4, the controlling circuit 17 determines whether or not the received pattern (RV pattern) of the seating pattern matches the empty pattern stored therein. When the determined result at step SC4 is Yes, the flow advances to step SC2. At step SC2, the system sets the air bag off data. When the determined result at step SC4 is No, the flow advances to step SC5. At step SC5, the controlling circuit 17 determines whether or not the received pattern (RV pattern) of the seating state matches the wet pattern stored therein. When the determined result at step SC5 is Yes, the flow advances to step SC2. At step SC2, the system sets the air bag off data. When the determined result at step SC5 is No, the flow advances to step SC6. At step SC6, the controlling circuit 17 sets the air bag on data that causes the air bag of the air bag device 18 to be placed in the inflatable state. Thereafter, the flow advances to step S6 (SRS communicating process) shown in FIG. 13.

The SRS data communicating process shown in FIG. 17 is performed as shown in FIGS. 20A, 20B, and 20C.

Since the controlling circuit 17 determines a seating pattern corresponding to a load current, reception signals of reception electrodes, and phase difference (received from the phase detecting circuit 20), the number of data pieces increases. Thus, the system can accurately determine a seating pattern. Since four electrodes E1 to E4 are disposed at predetermined intervals on the seat 1, there are 16 combinations of a transmission electrode and reception electrodes as shown in FIG. 11A. Thus, 16 data pieces are obtained. By adding phase difference data, the number of data pieces further increases. Consequently, the detecting performance and reliability of the seating pattern are improved.

In addition, since the controlling circuit 17 has stored four seating patterns shown in FIGS. 7A to 7D, 8A to 8D, 9A to 9D, and 10A to 10D and a seating pattern of a wet pattern corresponding to currents that flow in the electrodes, the controlling circuit 17 can compare signals in combinations of a transmission electrode and reception electrodes by the transmission/reception switching circuit 12 with various seating patterns that have been stored in the controlling circuit 17 and accurately detect an actual seating pattern.

Figure 22:
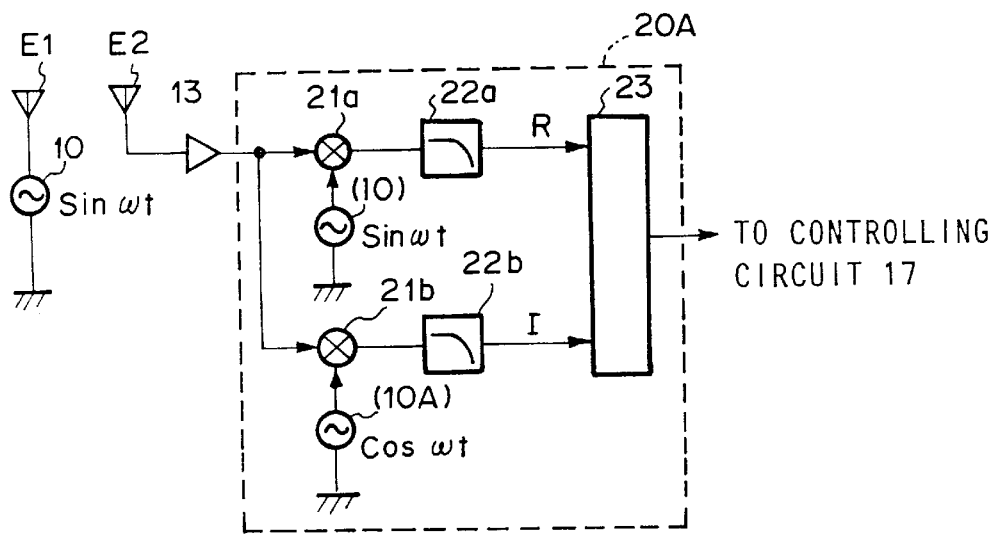
FIG. 22 is a block diagram showing a passenger detecting system according to another embodiment of the present invention.

FIG. 22 shows the structure of a passenger detecting system according to another embodiment of the present invention. This system includes a phase difference detecting circuit 20A. The phase difference detecting circuit 20A extracts the same component as a transmission signal from a reception signal and compares the phase difference between the phase of the transmission signal and the phase of the reception signal. The phase difference detecting circuit 20A comprises a first multiplying device 21a, a second multiplying device 21b, a first integrating device 22a, a second integrating device 22b, and a dividing circuit 23. The first multiplying device 21a multiplies an output signal (a reception signal: A sin ($\omega$t+$\theta$)+n)) of the current/voltage converting circuit 13 by a transmission signal (sin $\omega$t). The second multiplying device 21b multiplies the output signal of the current/voltage converting circuit 13 by a signal (10A cos $\omega$t) of which the transmission signal is phase-shifted by a phase shifter (not shown). The first integrating device 22a integrates an output signal of the first multiplying device 21a with respect to the period from 0 to T and outputs a real part R. The second integrating device 22b integrates an output signal of the second multiplying device 21b with respect to the period from 0 to T and outputs an imaginary part I. The dividing circuit 23 divides an output signal of the second integrating device 22b by an output signal of the first integrating device 22a. It should be noted that the electrodes E1 and E2 are not fixedly designated to a transmission electrode and a reception electrode, respectively. Thus, other electrodes may be designated to a transmission electrode and a reception electrode. In addition, output signals of the first integrating device 22a and the second integrating device 22b may be directly sent to the controlling circuit 17 not through the dividing circuit 23.

The phase difference detecting circuit 20A detects the phase difference between the phase of the transmission signal and the phase of the reception signal in the following manner. Assuming that a signal sent from the oscillating circuit 10 to the transmission electrode E1 is represented by sin $\omega$t and that a displacement current received from the reception electrode E2 through the current/voltage converting circuit 13 is represented by A sin ($\omega$t+$\theta$)+n (where $\theta$ represents phase difference; and n represents noise), an output signal of the first multiplying device 21a is represented by A sin ($\omega$t+$\theta$)·sin $\omega$t+n sin $\omega$t. Assuming that $\omega$t=x, the integrated result of the first integrating device 22a is expressed as follows.

$$R = \int_0^T [A\sin(x+\theta)\cdot\sin x + n\sin x]dx$$
$$= \frac{A}{2}\cos\theta\cdot T$$

Likewise, an output signal of which cos $\omega$t is multiplied by the second multiplying device 21b is expressed as follows.

A sin ($\omega$t+$\theta$)·cos $\omega$t+n cos $\omega$t. Assuming that $\omega$t=x, the integrated result of the second integrating device 22b is expressed as follows.

$$I = \int_0^T [A\sin(x+\theta)\cdot\cos x + n\cos x]dx$$
$$= \frac{A}{2}\sin\theta\cdot T$$

The resultant R and I are a real part (R) and an imaginary part (I) of which the noise is removed from a reception signal (A sin ($\omega$t+$\theta$)+n) obtained by the current/voltage converting circuit 13. The dividing circuit 23 calculates the following formula corresponding to the obtained R and I and outputs an amplitude r and a phase difference $\theta$. The phase difference is sent to the controlling circuit 17. The controlling circuit 17 processes the phase difference in the same manner as the above-described embodiment.

$$r = \sqrt{R^2 + I^2}$$

$$\theta = \tan^{-1}\frac{I}{R}$$

According to the embodiment, the circuit structure is simpler than the above-described embodiment. In FIG. 22, the transmission/reception switching circuit 12 and so forth are omitted. However, the phase difference detecting circuit 20A may be substituted with the phase difference detecting circuit 20 shown in FIG. 5.

Figure 23:
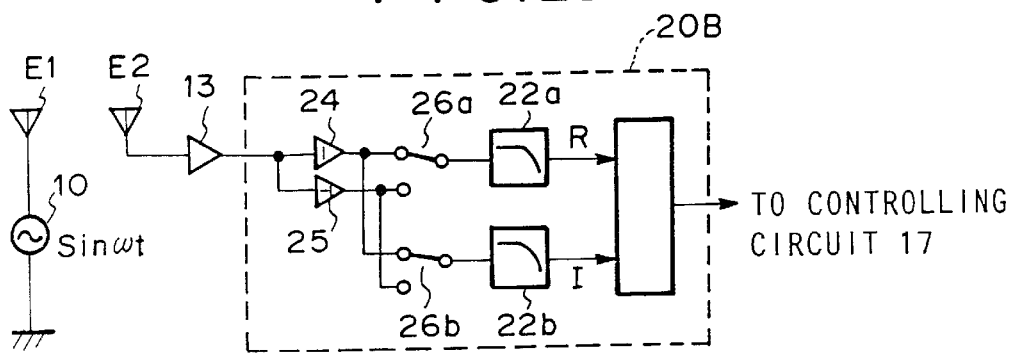
FIG. 23 is a block diagram showing a passenger detecting system according to another embodiment of the present invention.

FIG. 23 shows a passenger detecting system according to another embodiment of the present invention. This system includes a phase difference detecting circuit 20B. The phase difference detecting circuit 20B extracts the same component as a transmission signal from a reception signal and compares the phase difference between the phase of the transmission signal and the phase of the reception signal. The phase difference detecting circuit 20B comprises for example a buffer circuit 24 an inverter circuit 25, a first switching means 26a, a second switching means 26b, a first integrating device 22a, a second integrating device 22b, and a dividing circuit 23. The first switching means 26a switches output signals of the buffer circuit 24 and the inverter circuit 25 corresponding to a signal sin ωt. The second switching means 26b switches output signals of the buffer circuit 24 and the inverter circuit 25 corresponding to a signal cos ωt. The first integrating device 22a integrates an output signal of the first switching means 26a and outputs a real part R. The second integrating device 22b integrates an output signal of the second switching means 26b and outputs an imaginary part I. The dividing circuit 23 divides an output signal of the second integrating device 22b by an output signal of the first integrating device 22a. It should be noted that output signals of the first integrating device 22a and the second integrating device 22b may be direct sent to the controlling circuit 17 not through the dividing circuit 23.

According to the structure of this embodiment, when a signal by which the first multiplying device 21a shown in FIG. 22 multiplies a reception signal is a square wave A and a signal by which the second multiplying device 21b multiplies a reception signal is a square wave B that has a phase difference to the square wave A by 90°, the circuit can be structured at low cost. When these switching means are composed of multiplexers or the like, the cost can be reduced in comparison with the structure using expensive multiplying devices. Thus, the cost of the system can be effectively reduced.

According to the embodiment, since 12 data pieces of phase differences of transmission signal and reception signals are added to 16 data pieces of combinations of a transmission electrode and reception electrodes, the number of data pieces are remarkably increased. Thus, the seating pattern, the style, and wet state of the seat 1 can be accurately detected. Consequently, the detecting performance and reliability of the passenger detecting process can be improved.

It should be noted that the present invention is not limited to the above-described embodiments. In other words, the shape of electrodes disposed on a seat may be a rectangle, a circle, an ellipse, or any polygon (other than square). In addition, the number of electrodes may be any integer (except for, one, four, and six). Moreover, a plurality of electrodes may be selected as transmission electrodes. In this case, the amount of obtained data increases. The frequency of the output signal of the oscillating circuit may be other than 100 kHz depending on an object to be detected. In addition, the air bag device may use a mechanical sensor instead of an electronic acceleration sensor.

As described above, according to the present invention, a plurality of electrodes are disposed on the front surface of a seat. A low voltage at high frequency is applied between one transmission electrode and each of the other electrodes (reception electrodes) and thereby a weak electric field is generated. Thus, displacement currents corresponding to a seating pattern of a passenger flow in the reception electrodes. Consequently, by determining a feature pattern of the displacement currents, a seating pattern of a passenger can be accurately detected. Thus, the system can place the air bag of the air bag device in the inflatable state or non-inflatable state.

In particular, when four electrodes are disposed at predetermined intervals on a seat, the number of combinations of a transmission electrode and reception electrodes can be increased. In addition, the amount of data can be increased. Thus, the system can more accurately determine the seating pattern of the passenger on the seat.

In addition, since the controlling circuit of the system stores current patterns corresponding to for example seating patterns RFIS, FFCS, person, and empty, the controlling unit compares signals of the transmission electrode and the reception electrodes with the various seating patterns stored in a storing means of the controlling unit and extracts a relevant seating pattern. Thus, the system can accurately detect an actual seating pattern.

In particular, when the controlling circuit determines a seating pattern, the load current detecting circuit detects a load current that flows in a transmission electrode. The detected signal is sent to the controlling circuit along with reception signals. Thus, the amount of data increases. Consequently, the system can accurately detect the seating pattern of the passenger. For example, when four electrodes are disposed at predetermined intervals on a seat, 16 combinations of a transmission electrode and reception electrodes are obtained. Thus, 16 data pieces are obtained. Consequently, the detecting performance and reliability of the seating pattern can be improved.

In addition, since the load current detecting circuit detects a load current that flows in a transmission electrode, if a trouble such as a short-circuit of an oscillating circuit takes place, a load current largely increased unlike with the seating A patterns RFIS, FFCS, person, and empty. Thus, when the system determines a feature of the increase of the load current, it can easily diagnose an occurrence of the short-circuit in the circuit.

In particular, since the first switching means and the second switching means of the transmission/reception switching circuit controlled by the controlling circuit select a particular electrode connected to the oscillating circuit and other electrodes connected to the current/voltage converting circuit, the reception signals and the transmission signal can be promptly sent to the controlling circuit. Thus, much information can be obtained without need to increase the number of electrodes. Consequently, the system can accurately and properly determine the seating pattern of the passenger.

In addition, since the first switching means and the second switching means of the transmission/reception switching circuit controlled by the controlling circuit select a transmission electrode (a particular electrode) connected to the oscillating circuit and reception electrodes (electrodes other than the particular electrode) connected to the current/voltage converting circuit, the reception signals and the transmission signal can be promptly sent to the controlling circuit. Thus, much information can be obtained without need to increase the number of electrodes. Consequently, the system can accurately and properly determine the seating pattern of the passenger.

In particular, since the phase difference detecting circuit is disposed on the output side of the current/voltage converting circuit, the phase difference between the phase of a transmission signal and the phases of reception signals can be easily detected corresponding to the transmission signal obtained by the oscillating circuit and the reception signals obtained by the current/voltage converting circuit connected to the reception electrodes. Thus, when a seat gets wet, a transmission signal and reception signals vary in a pattern different from the person pattern. Thus, the system can accurately determine the wet pattern without confusion to the person pattern. Consequently, the system can obtain much information without need to increase the number of electrodes and accurately and properly determine the seating pattern of the passenger and the state of the seat.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A passenger detecting system, comprising:

a seat;

a plurality of electrodes disposed at predetermined intervals on at least the front surface of said seat;

an oscillating circuit for generating a weak electric field between at least one particular electrode (referred to as a first type electrode) of said electrodes and the other electrodes (referred to as second type electrodes);

a current/voltage converting circuit for detecting displacement currents that flow corresponding to the weak electric field and for converting the displacement currents into respective voltages; and a controlling circuit for detecting a seating pattern indicative of an orientation of a passenger on said seat corresponding to output signals of said current/voltage converting circuit.

2. The passenger detecting system as set forth in claim 1, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

3. The passenger detecting system as set forth in claim 1, wherein two electrodes of said electrodes are disposed at different positions of a surface on said seat and two other electrodes thereof are disposed at different positions of a back rest of said seat, and wherein the first type electrode is a transmission electrode and the second type electrodes are reception electrodes.

4. The passenger detecting system as set forth in claim 1, wherein said controlling circuit compares various stored seating patterns that have been stored therein with a calculated seating pattern calculated corresponding to the output signals of said current/voltage converting circuit and extracts a relevant pattern so as to detect said seating pattern of a passenger.

5. A passenger detecting system, comprising:

a seat;

a plurality of electrodes disposed at predetermined intervals on at least the front surface of said seat;

an oscillating circuit for generating a weak electric field between at least one particular electrode (referred to as a first type electrode) of said electrodes and the other electrodes (referred to as second type electrodes);

a current/voltage converting circuit for detecting displacement currents that flow corresponding to the weak electric field and for converting the displacement currents into respective voltages;

a controlling circuit for detecting a seating pattern indicative of an orientation of a passenger on said seat corresponding to output signals of said current/voltage converting circuit; and an air bag device for inflating an air bag in case of a collision, wherein data corresponding to the detected result of said controlling circuit is sent to said air bag device so as to place the air bag of said air bag device in an inflatable state or a non-inflatable state.

6. The passenger detecting system as set forth in claim 5, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

7. The passenger detecting system as set forth in claim 5, wherein two electrodes of said electrodes are disposed at different positions of a surface on said seat and two other electrodes thereof are disposed at different positions of a back rest of said seat, and a wherein the first type electrode is a transmission electrode and the second type electrodes are reception electrodes.

8. The passenger detecting system as set forth in claim 5, wherein said controlling circuit compares various stored seating patterns that have been stored therein with a calculated seating pattern calculated corresponding to the output signals of said current/voltage converting circuit and extracts a relevant pattern so as to detect said seating pattern of a passenger.

9. A passenger detecting method, comprising the steps of:

generating a weak electric field between at least one particular electrode (referred to as a first type electrode) of a plurality of electrodes disposed on a front surface of a seat and the other electrodes (referred to as second type electrodes);

detecting displacement currents that flow corresponding to the weak electric field; and detecting a seating pattern indicative of an orientation of a passenger on the seat corresponding to the displacement currents.

10. A passenger detecting method, comprising the steps of:

generating a weak electric field between at least one particular electrode (referred to as a first type electrode) of a plurality of electrodes disposed on a front surface of a seat and the other electrodes (referred to as second type electrodes);

detecting displacement currents that flow corresponding to the weak electric field;

detecting a seating pattern indicative of an orientation of a passenger on the seat;

sending data corresponding to the detected result to an air bag device; and if placing the air bag of the air bag device in an inflatable state or a non-inflatable state.

11. A passenger detecting system, comprising:

a seat;

a plurality of electrodes disposed at predetermined intervals on at least the front surface of said seat;

a load current detecting circuit for detecting a load current that flows from said oscillating circuit to the first type electrode;

a current/voltage converting circuit for detecting displacement currents that flow corresponding to the weak electric field generated between the first type electrode and the second type electrodes; and a controlling circuit for detecting a seating pattern indicative of an orientation of a passenger on said seat corresponding to output signals of said load current detecting circuit and said current/voltage converting circuit.

12. The passenger detecting system as set forth in claim 11, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

13. The passenger detecting system as set forth in claim 11, wherein two electrodes of said electrodes are disposed at different positions of a surface on said seat and two other electrodes thereof are disposed at different positions of a back rest of said seat, and wherein the first type electrode is a transmission electrode and the second type electrodes are reception electrodes.

14. The passenger detecting system as set forth in claim 11, wherein said load current detecting circuit comprises:
an impedance device connected in series to the output side of said oscillating circuit; and
an amplifier for amplifying a terminal voltage of said impedance device.

15. The passenger detecting system as set forth in claim 11, wherein said controlling circuit compares various stored seating patterns that have been stored therein with a calculated seating pattern calculated corresponding to the output signals of said load current detecting circuit and said current/voltage converting circuit and extracts a relevant pattern so as to detect said seating pattern of a passenger.

16. A passenger detecting system, comprising:

a seat;

a plurality of electrodes disposed at predetermined intervals on at least the front surface of said seat;

a load current detecting circuit for detecting a load current that flows from said oscillating circuit to the first type electrode;

a current/voltage converting circuit for detecting displacement currents that flow corresponding to the weak electric field generated between the first type electrode and the second type electrodes;

a controlling circuit for detecting a seating pattern indicative of an orientation of a passenger on said seat corresponding to output signals of said load current detecting circuit and said current/voltage converting circuit; and an air bag device for inflating an air bag in case of a collision, wherein data corresponding to the detected result of said controlling circuit is sent to said air bag device so as to place the air bag of said air bag device in an inflatable state or a non-inflatable state.

17. The passenger detecting system as set forth in claim 16, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

18. The passenger detecting system as set forth in claim 16, wherein two electrodes of said electrodes are disposed at different positions of a surface on said seat and two other electrodes thereof are disposed at different positions of a back rest of said seat, and wherein the first type electrode is a transmission electrode and the second type electrodes are reception electrodes.

19. The passenger detecting system as set forth in claim 16, wherein said load current detecting circuit comprises:
an impedance device connected in series to the output side of said oscillating circuit; and
an amplifier for amplifying a terminal voltage of said impedance device.

20. The passenger detecting system as set forth in claim 16, wherein said controlling circuit compares various stored seating patterns that have been stored therein with a seating pattern calculated corresponding to the output signals of said load current detecting circuit and said current/voltage converting circuit and extracts a relevant pattern so as to detect said seating pattern of a passenger.

21. A passenger detecting method, comprising the steps of:

generating a weak electric field between at least one particular electrode (referred to as a first type electrode) of a plurality of electrodes disposed on a front surface of a seat and the other electrodes (referred to as second type electrodes);

detecting displacement currents that flow corresponding to the weak electric field;

detecting a load current that flows in an oscillating circuit that generates the weak electric field and in the first type electrode; and detecting a seating pattern indicative of an orientation of a passenger on the seat corresponding to the displacement currents and the load current.

22. A passenger detecting method, comprising the steps of:

generating a weak electric field between at least one particular electrode (referred to as a first type electrode) of a plurality of electrodes disposed on a front surface of a seat and the other electrodes (referred to as second type electrodes);

detecting displacement currents that flow corresponding to the weak electric field;

detecting a load current that flows in an oscillating circuit that generates the weak electric field and in the first type electrode;

detecting a seating pattern of a passenger on the seat corresponding to the displacement currents and the load current;

sending data corresponding to the detected result to an air bag device; and placing the air bag of the air bag device in an inflatable state or a non-inflatable state.

23. A passenger detecting system, comprising:

a seat;

a plurality of electrodes disposed at predetermined intervals on at least the front surface of said seat;

an oscillating circuit for generating a weak electric field between at least one particular electrode (referred to as a first type electrode) of said electrodes and the other electrodes (referred to as second type electrodes);

a current/voltage converting circuit for detecting displacement currents that flow corresponding to the weak electric field and for converting the displacement currents into respective voltages;

a transmission/reception switching circuit for selectively connecting the first type electrode as a transmission electrode and the second type electrodes as reception electrodes to said oscillating circuit and said current/voltage converting circuit, respectively; and a controlling circuit for detecting a seating pattern indicative of an orientation of a passenger on said seat corresponding to output signals of said current/voltage converting circuit, wherein said transmission/reception switching circuit is controlled corresponding to an output signal of said controlling circuit.

24. The passenger detecting system as set forth in claim 23, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

25. The passenger detecting system as set forth in claim 23, wherein two electrodes of said electrodes are disposed at different positions of a surface on said seat and two other electrodes thereof are disposed at different positions of a back rest of said seat, and wherein the first type electrode is a transmission electrode and the second type electrodes are reception electrodes.

26. The passenger detecting system as set forth in claim 23, wherein said transmission/reception switching circuit comprises:

a plurality of first switching means for selectively connecting at least the first type electrode to said oscillating circuit; and a plurality of second witching means for selectively connecting the second type electrodes to said current/voltage converting circuit, wherein said first switching means and said second switching means are controlled corresponding to an output signal of said controlling circuit.

27. The passenger detecting system as set forth in claim 23, wherein said controlling circuit compares various stored seating patterns that have been stored therein with a calculated seating pattern calculated corresponding to signals that are input to said controlling circuit and extracts a relevant pattern so as to detect said seating pattern of a passenger.

28. A passenger detecting system, comprising:

a seat;

a plurality of electrodes disposed at predetermined intervals on at least the front surface of said seat;

an oscillating circuit for generating a weak electric field between at least one particular electrode (referred to as a first type electrode) of said electrodes and the other electrodes (referred to as second type electrodes);

a load current detecting circuit for detecting a load current that flows from said oscillating circuit to the first type electrode;

a current/voltage converting circuit for detecting displacement currents that flow corresponding to the weak electric field and for converting the displacement currents into respective voltages;

a transmission/reception switching circuit for selectively connecting the first type electrode as a transmission electrode and the second type electrodes as reception electrodes to said oscillating circuit and said oscillating circuit, respectively;

a controlling circuit for detecting a seating pattern indicative of an orientation of a passenger on said seat corresponding to output signals of said load current detecting circuit and said current/voltage converting circuit; and an air bag device for inflating an air bag in case of a collision, wherein said transmission/reception switching circuit is controlled corresponding to an output signal of said controlling circuit, and wherein data corresponding to the detected result of said controlling circuit is sent to said air bag device so as to place the air bag of said air bag device in an inflatable state or a non-inflatable state.

29. The passenger detecting system as set forth in claim 28, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

30. The passenger detecting system as set forth in claim 28, wherein two electrodes of said electrodes are disposed at different positions of a surface on said seat and two other electrodes thereof are disposed at different positions of a back rest of said seat, and wherein the first type electrode is a transmission electrode and the second type electrodes are reception electrodes.

31. The passenger detecting system as set forth in claim 28, wherein said transmission/reception switching circuit comprises:
a plurality of first switching means for selectively connecting at least the first type electrode to said oscillating circuit; and
a plurality of second witching means for selectively connecting the second type electrodes to said current/voltage converting circuit,
wherein said first switching means and said second switching means are controlled corresponding to an output signal of said controlling circuit.

32. The passenger detecting system as set forth in claim 28, wherein said controlling circuit compares various stored seating patterns that have been stored therein with a calculated seating pattern calculated corresponding to signals that are input to said controlling circuit and extracts a relevant pattern so as to detect said seating pattern of a passenger.

33. A passenger detecting method, comprising the steps of:

generating a weak electric field between at least one particular electrode (referred to as a first type electrode) of a plurality of electrodes disposed on a front surface of a seat and the other electrodes (referred to as second type electrodes);
detecting displacement currents that flow corresponding to the weak electric field;
switching the first type electrode as a transmission electrode and the second type electrodes as reception electrodes so as to detect the displacement currents thereof; and
detecting a seating pattern indicative of an orientation of a passenger on the seat corresponding to the displacement currents.

34. A passenger detecting method, comprising the steps of:

generating a weak electric field between at least one particular electrode (referred to as a first type electrode) of a plurality of electrodes disposed on a front surface of a seat and the other electrodes (referred to as second type electrodes);
switching the first type electrode as a transmission electrode and the second type electrodes as reception electrodes and so as to detect the displacement currents thereof;
detecting a seating pattern indicative of an orientation of a passenger on the seat corresponding to the displacement currents;
sending data corresponding to the detected result to an air bag device; and
placing the air bag of the air bag device in an inflatable state or a non-inflatable state.

35. A passenger detecting system, comprising:

a seat;
a plurality of electrodes disposed at predetermined intervals on at least the front surface of said seat;
an oscillating circuit for generating a weak electric field between at least one particular electrode of said electrodes as a transmission electrode and the other electrodes thereof as reception electrodes;
a current/voltage converting circuit for detecting displacement currents that flow in the reception electrodes corresponding to the weak electric field generated between the transmission electrode and the reception electrodes and converting the displacement currents to respective voltages;
a phase difference detecting circuit for detecting the phase difference between the phase of a signal sent from said oscillating circuit to the transmission electrode and the phases of output signals of said current/voltage converting circuit; and
a controlling circuit for detecting a seating pattern indicative of an orientation of a passenger on said seat corresponding to at least output signals of said phase difference detecting circuit.

36. The passenger detecting system as set forth in claim 35, wherein said oscillating circuit generates a low voltage at high frequency,
wherein the first type electrode is a transmission electrode and the second type electrodes are reception electrodes, and
wherein the low voltage at high frequency causes a weak electric field to be generated between the transmission electrodes and the reception electrodes.

37. The passenger detecting system as set forth in claim 35, wherein two electrodes of said electrodes are disposed at different positions of a surface on said seat and two other electrodes thereof are disposed at different positions of a back rest of said seat, and
wherein the first type electrode is a transmission electrode and the second type electrodes are reception electrodes.

38. The passenger detecting system as set forth in claim 35, wherein said phase difference detecting circuit detects the phase difference between the phase of the transmission signal sent from said oscillating circuit to the transmission electrode and the phases of the reception signals received from said current/voltage converting circuit corresponding to) the transmission signal.

39. The passenger detecting system as set forth in claim 35, wherein said phase difference detecting circuit shapes the transmission signal of the transmission electrode and the reception signals of the reception electrodes into respective square waves and detects a leading edge or a trailing edge of each of the reception signals corresponding to a leading edge of the transmission signal so as to detect the phase difference between the phase of the transmission signal and the phases of the reception signals.

40. The passenger detecting system as set forth in claim 35, wherein said controlling circuit compares various stored seating patterns that have been stored therein with a calcualted seating pattern calculated corresponding to signals that are input to said controlling circuit and extracts a relevant pattern so as to detect said seating pattern of a passenger.

41. A passenger detecting system, comprising:

a seat;
a plurality of electrodes disposed at predetermined intervals on at least the front surface of said seat;

an oscillating circuit for generating a weak electric field between at least one particular electrode of said electrodes as a transmission electrode and the other electrodes thereof as reception electrodes;

a load current detecting circuit for detecting a load current that flows from said oscillating circuit to the transmission electrode;

a current/voltage converting circuit for detecting displacement currents that flow in the reception electrodes corresponding to the weak electric field generated between the transmission electrode and the reception electrodes and converting the displacement currents to respective voltages;

a transmission/reception switching circuit for selectively connecting the transmission electrode and the reception electrodes to said oscillating circuit and said current/voltage converting circuit, respectively;

a phase difference detecting circuit for detecting the phase difference between the phase of a signal sent from said oscillating circuit to the transmission electrode and the phases of output signals of said current/voltage converting circuit;

a controlling circuit for detecting a seating pattern indicative of an orientation of a passenger on said seat corresponding to output signals of said load current detecting circuit, said current/voltage converting circuit, and said phase difference detecting circuit; and an air bag device for inflating an air bag in case of a collision, wherein data corresponding to the detected result of said controlling circuit is sent to said air bag device so as to place the air bag of said air bag device in an inflatable state or a non-inflatable state.

42. The passenger detecting system as set forth in claim 41, wherein said oscillating circuit generates a low voltage at high frequency, wherein the first type electrode is a transmission electrode and the second type electrodes are reception electrodes, and wherein the low voltage at high frequency causes a weak electric field to be generated between the transmission electrodes and the reception electrodes.

43. The passenger detecting system as set forth in claim 41, wherein two electrodes of said electrodes are disposed at different positions of a surface on said seat and two other electrodes thereof are disposed at different positions of a back rest of said seat, and wherein the first type electrode is a transmission electrode and the second type electrodes are reception electrodes.

44. The passenger detecting system as set forth in claim 41, wherein said phase difference detecting circuit detects the phase difference between the phase of the transmission signal sent from said oscillating circuit to the transmission electrode and the phases of the reception signals received from said current/voltage converting circuit corresponding to the transmission signal.

45. The passenger detecting system as set forth in claim 41, wherein said phase difference detecting circuit shapes the transmission signal of the transmission electrode and the reception signals of the reception electrodes into respective square waves and detects a leading edge or a trailing edge of each of the reception signals corresponding to a leading edge of the transmission signal so as to detect the phase difference between the phase of the transmission signal and the phases of the reception signals.

46. The passenger detecting system as set forth in claim 41, wherein said controlling circuit compares various stored seating patterns that have been stored therein with a calculated seating pattern calculated corresponding to signals that are input to said controlling circuit and extracts a relevant pattern so as to detect said seating pattern of a passenger.

47. A passenger detecting method comprising the steps of:

generating a weak electric field between at least one particular electrode (referred to as a first type electrode) of a plurality of electrodes disposed on a front surface of a seat and the other electrodes (referred to as second type electrodes);

detecting displacement currents that flow corresponding to the weak electric field;

switching the first type electrode as a transmission electrode and the second type electrodes as reception electrodes so as to detect the displacement currents thereof;

detecting the phase differences between the phase of the transmission signal of the transmission electrode and the phases of the reception signals of the reception electrodes; and detecting a seating pattern indicative of an orientation of a passenger on the seat corresponding to the displacement currents and the phase difference.

48. A passenger detecting method, comprising the steps of:

generating a weak electric field between at least one particular electrode (referred to as a first type electrode) of a plurality of electrodes disposed on a front surface of a seat and the other electrodes (referred to as second type electrodes);

switching the first type electrode as a transmission electrode and the second type electrodes as reception electrodes and so as to detect the displacement currents thereof;

detecting the phase difference between the phase of the transmission signal of the transmission electrode and the phases of the reception signals as the displacement currents;

detecting a seating pattern indicative of an orientation of a passenger on the seat corresponding to the displacement currents and the phase difference;

sending data corresponding to the detected result to an air bag device; and placing the air bag of the air bag device in an inflatable state or a non-inflatable state.

* * * * *